Sept. 1, 1953 E. L. G. TORCHEUX ET AL 2,651,032
LOCALIZATION SYSTEM
Filed March 1, 1949 7 Sheets-Sheet 1

INVENTORS:
EMILE LÉON GABRIEL TORCHEUX
ÉTIENNE AUGUSTIN HENRI HONORÉ
by: J Delalter
Attorney

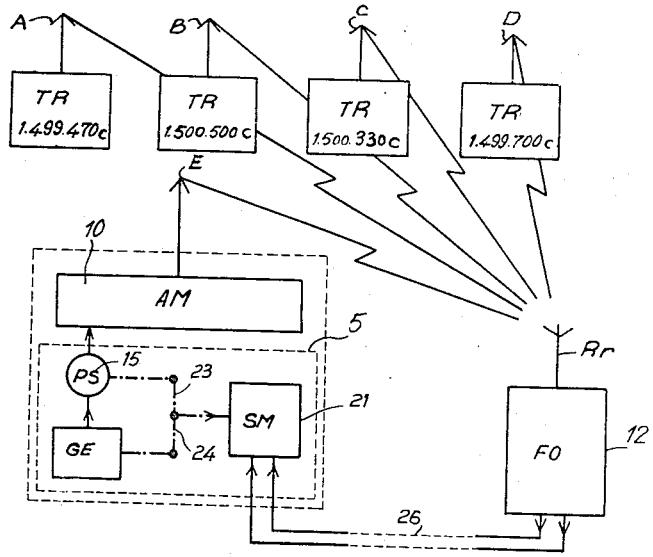
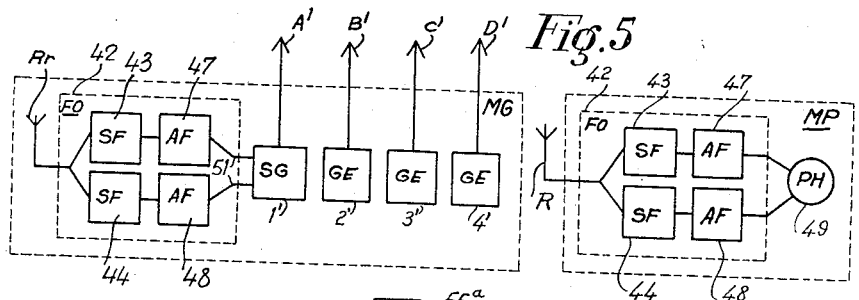
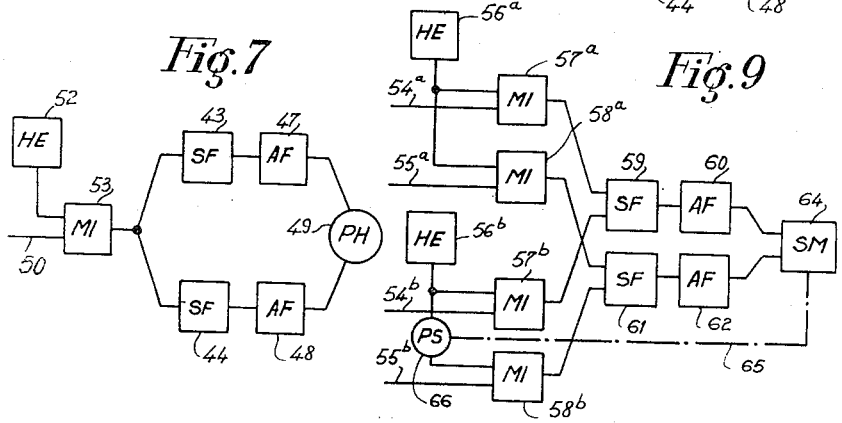

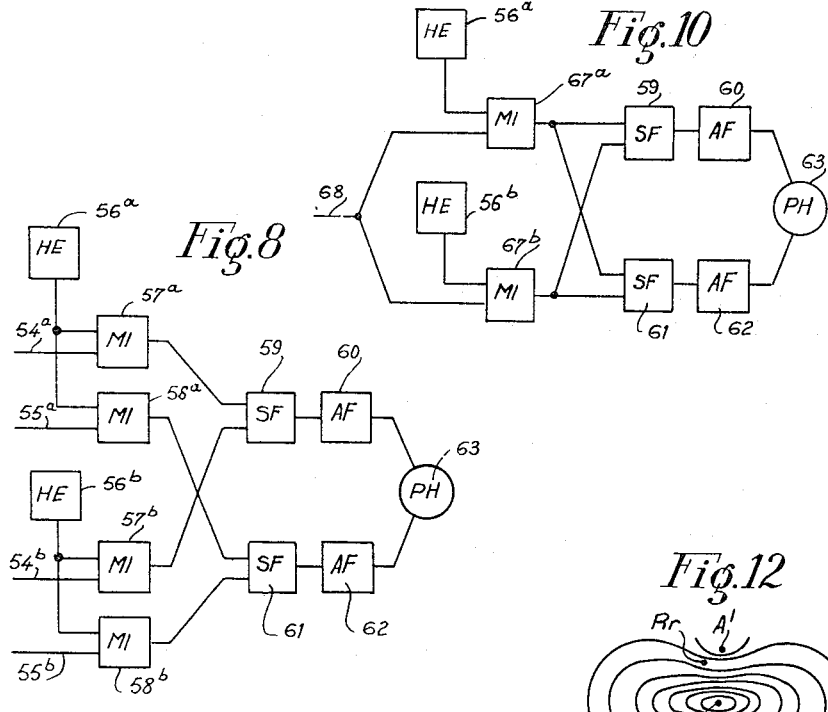
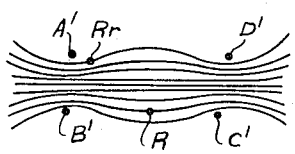
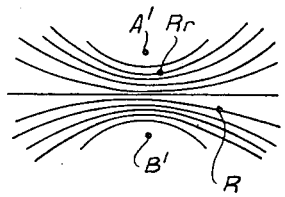
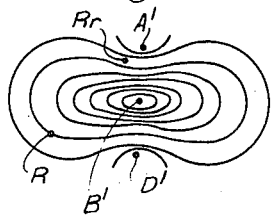
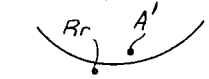
INVENTORS:
EMILE LÉON GABRIEL TORCHEUX
ETIENNE AUGUSTIN HENRI HONORÉ
By: J. Delatter Segary
Attorney

INVENTORS:
EMILE LÉON GABRIEL TORCHEUX
ETIENNE AUGUSTIN HENRI HONORÉ

Attorney.

Patented Sept. 1, 1953

2,651,032

UNITED STATES PATENT OFFICE 2,651,032

LOCALIZATION SYSTEM

Emile Léon Gabriel Torcheux and Etienne Augustin Henri Honoré, Paris, France

Application March 1, 1949, Serial No. 79,074
In France March 2, 1948

26 Claims. (Cl. 343—105)

This invention relates to a location system and more particularly to a new system for the location of a receiving point of unknown position relative to a plurality of transmitters of known position by comparing at said receiving point the phases of signals emitted by the transmitters.

As is well known, such comparisons make it possible to determine equiphase lines passing through the receiving point, the position of which is to be ascertained and in this way enable the location thereof to be determined.

In known systems, the signals emitted by the transmitters must stay in rigid relation to each other and generally they are the harmonics of a single frequency. This has many drawbacks. The required apparatus is complicated, and the utilization of harmonic frequencies involves the necessity of employing numerous frequency bands. Also the elimination of the ambiguities which are inherent to all equiphase line systems, involves considerable difficulties, especially if a complete elimination of these ambiguities is desired.

In accordance with the present invention, practically any frequencies may be utilized. It is moreover possible to employ a lesser number of wave lengths than in prior systems. Also, the elimination of the above-referred-to ambiguities is very simply accomplished with relatively simple apparatus.

It has been found that it is always possible to obtain from at least three signals having frequencies $F_1, F_2, \ldots F_n$ by known operations such as frequency mixing, frequency multiplying, filtering, etc., or combinations thereof, at least one pair of derived signals having frequencies $F_a$ and $F_b$ such that the following relation is satisfied:

$$F_a - F_b = K_1 F_1 + K_2 F_2 \ldots + K_n F_n$$

where $K_1, K_2, \ldots K_n$ are integers, at least one of which is positive and one of which is negative.

If the frequencies $F_1, F_2, \ldots F_n$ and the integers $K_1, K_2, \ldots K_n$ are selected such that $$K_1 F_1 + K_2 F_2 \ldots + K_n F_n = 0$$

then $$F_a - F_b = 0 \text{ or } F_a = F_b$$

Thus two signals of exactly equal frequency can be obtained which can be compared and their phase difference $\phi_s = \phi_a - \phi_b$ determined by a phasemeter.

The following relation can be derived from the first relation above given:

$$\phi_s = \phi_a - \phi_b = K_1 \phi_1 + K_2 \phi_2 \ldots + K_n \phi_n + C$$

where $\phi_1$, $\phi_2$ and $\phi_3$ are the respective phases of the various signals and C is a constant which can be made zero by adjusting a phase in the system. The above relations are valid at any point in a system.

If the signals having the frequencies $F_1, F_2, \ldots F_n$ are transmitted through space from at least two spaced transmitting points, i. e., are divided between at least two spaced transmitters and received at a single receiving point, the following relations which can be derived from the last relation above given:

$$\phi_s = \phi_a - \phi_b = \frac{-2\pi}{V}(K_1 F_1 D_2 + K_2 F_2 D_2 \ldots + K_n F_n D_n) + C$$

where $D_1, D_2, \ldots D_n$ are the respective distances between the receiver and the transmitters emitting the signals $F_1, F_2 \ldots F_n$, V is the velocity of propagation of the signals through space, $\phi_s$, $\phi_a$ and $\phi_b$ are in radians and refer to the phase relations of the two signals of equal frequency derived at the receiver, and C is a constant, which if desired can be made zero so that for practical purposes the last relation can be written as follows:

$$\phi_s = \frac{-2\pi}{V}(K_1 F_1 D_1 + K_2 F_2 D_2 \ldots + K_n F_n D_n)$$

From either of the last two relations, plots of equiphase lines in space can be prepared for any system of any number of spaced transmitters greater than one which transmits any number of frequencies greater than two divided between the transmitters. If $K_1, K_2 \ldots K_n$ and $F_1, F_2 \ldots F_n$ are selected or known such that the relations $K_1 F_1 + K_2 F_2 \ldots + K_n F_n = 0$ is satisfied, two signals of exactly equal frequency can be obtained at the receiving point so that $\phi_s$ can be directly calculated or measured.

The last relation for $\phi_s$ given above may be written in the form $$\phi_s = \frac{2\pi F_c}{V} f(D)$$

In this relation, $F_c$ is a number which may be termed the characteristic frequency of the type of system thus far discussed. It defines the density of the equiphase lines provided by such a system.

Also in this relation, $f(D)$ is a linear and simple function of the distances $D_1, D_2 \ldots D_n$ between the various transmitters of such a system and the receiving point. This function defines the shape of the equiphase lines.

From the relation $K_1 F_1 + K_2 F_2 \ldots + K_n F_n = 0$, it follows that all of the frequencies of the transmitted signals can vary within limits provided that at least one of the frequencies is compensatingly varied to maintain the value of zero. The variation of the various frequencies merely affects the accuracy of the distance determinations, and if the percentage variations of the frequencies are small, the percentage error in the distance determinations is correspondingly small. That is to say, all of the transmitters may have their frequencies determined, for example, by independent crystal-controlled oscillators and the oscillator for one of the stations also controlled from information obtained from signals received from all of the transmitters to compensatingly vary the frequency of the one station.

Also from the relation $$\phi_s = K_1\phi_1 + K_2\phi_2 \ldots K_n\phi_n + C$$

it follows that the phases of the various signals from the transmitters may vary within limits and the phase of at least one of the transmitted signals compensatingly varied from information obtained from signals received from all of the transmitters so as to maintain C constant or zero. Thus all of the transmitters except one may be independent of each other provided the frequency and phase of the signal from one of the transmitters is varied to compensate for frequency and phase drift in the other transmitters. This can be easily accomplished automatically by providing a receiving station at a known location with respect to the transmitters to receive the signals from all of the transmitters and feeding back the required correcting information from this receiving station to the one transmitter.

The system so far described may be termed an "elementary system." The information derived at the receiver merely enables the receiver to be located on a line of given phase shift $\phi_s$. In any elementary system there will ordinarily be a plurality of lines of the same phase shift so that an ambiguity exists as to which line of this phase shift passes through the receiving point.

By employing a plurality of elementary systems combined in what may be termed a "multiple system" so as to produce a plurality of sets of equiphase lines all having the same shape but different spacings between the lines of equal phase shift, this ambiguity can be eliminated. For example, the sets of equiphase lines can have relative spacings between lines of equal phase shift which differ from each other by a factor of 10, i. e., are proportional to 1, 10, 100 etc. By measuring at a receiving point of unknown location the phase differences between the two derived signals of equal frequency corresponding to each set of equiphase lines, it can be determined which line of equal phase shift passes through that receiving point. Such a multiple system, however, locates the receiving point on a line of equal phase shift only and does not locate the position of the receiving point on that line.

By employing a combination of two or more multiple systems in what may be termed a "complete system" to provide a plurality of families of intersecting equiphase lines, it is possible to locate the receiving point on two or more lines intersecting at a point to thus determine the position of the receiving point without ambiguity.

The invention also contemplates more elaborate systems which may be termed "combined systems." Such systems are a combination of a plurality of complete systems and may be arranged so that the frequencies employed are concentrated in a few relatively narrow frequency bands, and a single receiver may be adjusted to receive and utilize the frequencies corresponding to any desired elementary or multiple system.

An object of the present invention is therefore to provide elementary, multiple, complete and combined location systems operating in accordance with the principle above discussed.

Other objects and advantages of the invention will appear in the following description of various modifications thereof shown in the attached drawings, of which:

Fig. 3 is a block diagram of the transmitting station of Fig. 1 showing in more detail the mechanism for controlling one of the transmitters by control signals received from a control receiving station in order to compensate for drift in frequency and phase by the various transmitters.

Fig. 5 is a diagram similar to Fig. 1 showing a modified elementary system employing four frequencies.

Fig. 7 is a block diagram of a modified receiver suitable for employment in the system of Fig. 5.

Figs. 8, 9 and 10 are block diagrams of modified receivers suitable for systems employing four frequencies.

Figs. 11, 12, 13 and 14 are plots showing different patterns of equiphase lines obtained with elementary systems employing four signals.

Figure 1:
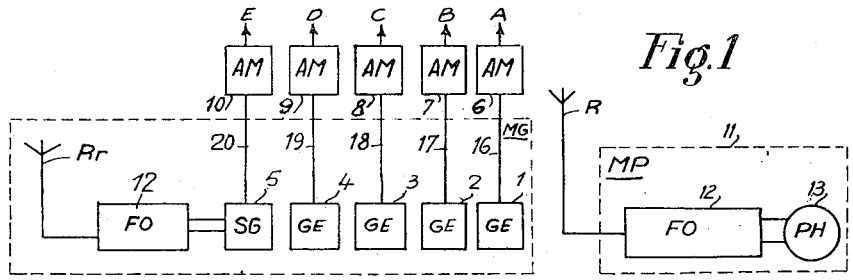
Fig. 1 is a block diagram of an elementary system in accordance with the present invention employing five frequencies.

Referring to Fig. 1 of the drawings, this figure shows, by way of example, a location system including a transmitting station having five frequency generators, 1 to 5 inclusive, each generating a different frequency, and supplying amplifiers 6 to 10 respectively, each labeled AM in turn supplying aerials A to E respectively, from which continuous radio waves having respectively the frequencies of the generators 1 to 5 are radiated. The generators 1 to 4 inclusive, each labeled GE, may, for example, be independently crystal-controlled oscillators while the generator 5, labeled SG, may be a synchronizing generator the frequency and phase of which is automatically controlled or regulated, as later described. The aerials A to D inclusive may, for example, be arranged at the four corners of a square inscribed in a circle of a radius of one kilometer at the center of which aerial E is positioned.

The frequencies of the transmitted signals may, for example have the following values respectively:

1,499,470 cycles (A), 1,500,500 cycles (B), 1,500,300 cycles (C), 1,499,700 cycles (D) and 1,500,000 cycles (E).

The transmitting station may include a control or regulation receiver provided with an aerial $R_r$. As will be described hereinafter this receiver is used to control or regulate the generator 5 which feeds the aerial E. The location of $R_r$ is fixed and its distance from aerial E may, for example, be 2,400 meters.

The system of Fig. 1 may also include a mobile receiver 11 having a receiving aerial R with respect to which it is desired to determine the distance to the transmitting aerial E. As will be explained below the mobile receiver may be employed to derive two low frequency currents from the currents resulting from the received signals and to measure the relative phase shift $\phi_s$ of said currents.

This relative phase shift is related to the position of the mobile receiver and depends on the distance D of the mobile receiver from transmitting aerial E. With the frequencies and arrangement of transmitting aerials above assumed, when the distance D is several kilometers it can be shown that $$\phi_s = \frac{1,800}{D}$$

approximately $\phi_s$ being expressed in degrees and D in kilometers. Thus at a distance D greater than a few kilometers, the equiphase lines are approximately concentric circles having centers at the location of the transmitting aerial E.

It is to be noted, that a knowledge of the value of distance D alone is not sufficient to completely determine the position of the mobile receiver and that if distance D becomes smaller than 5 kilometers the phase shift exceeds 360 degrees. That is to say the relative phase shift $\phi_s$ is the same as if D were very great. As it is well known, such ambiguities occur, in most localization systems which use phase shift measurements.

It will be shown below how more complete systems make it possible to eliminate both these ambiguities.

Figure 4:
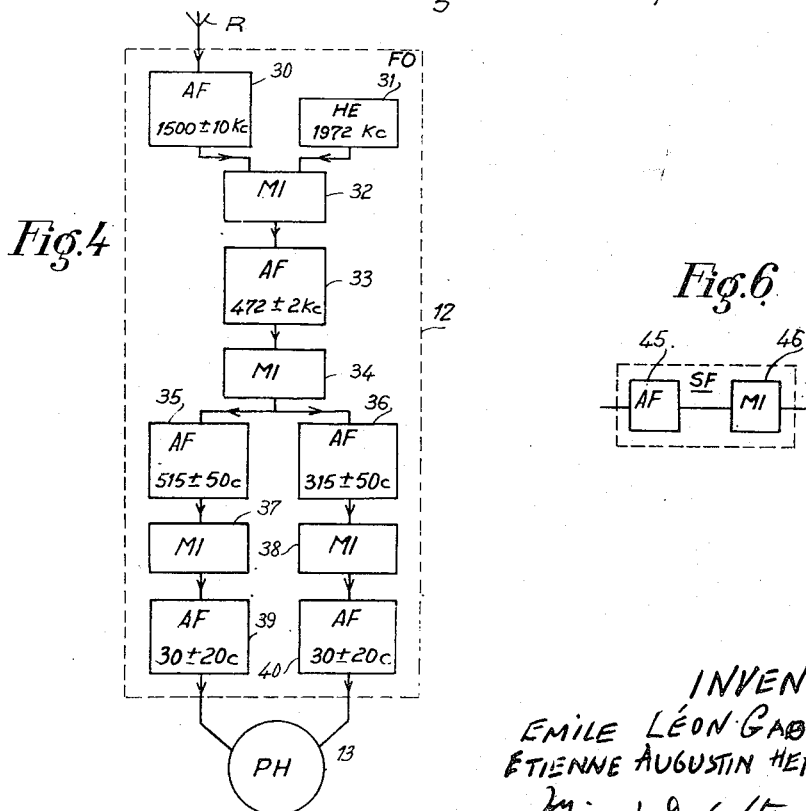
Fig. 4 is a block diagram of a receiver suitable for employment in the system of Fig. 1.

The mobile receiver 11 of Fig. 1 may include a circuit 12 shown in more detail in Fig. 4, which circuit may be termed "a frequency operator" and may also include a phasemeter 13 to indicate the relative phase shift $\phi_s$ of the two currents of equal frequency referred to above, which are derived by the frequency operator 12 from the five signals of different frequencies radiated from the aerials A to E and received by the receiving aerial R.

It is to be noted that the transmitting station also includes a frequency operator 12 as part of its control or regulation receiver 5. In the system of Fig. 1, the frequency operator 12 of the transmitting station receives signal energy from all of the transmitting aerials A to E through the aerial $R_r$. However, as shown in Fig. 2, it is entirely possible to supply signal energy to the frequency operator 12 of the transmitting station by direct wires from the connections 16 to 20 which connect the generators 1 to 5 respectively to the amplifiers 6 to 10 respectively.

Figure 2:
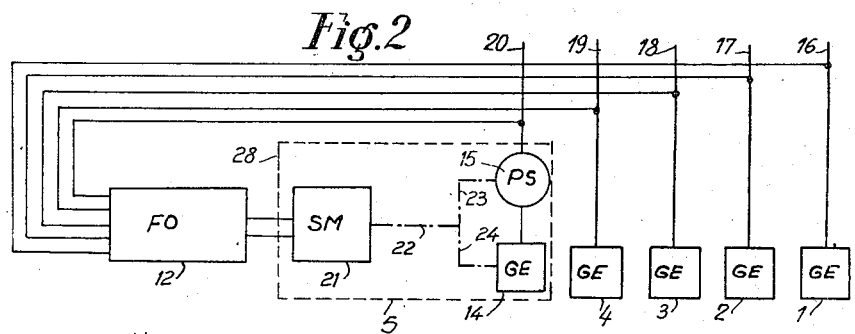
Fig. 2 is a block diagram showing a modification of the transmitting station of Fig. 1 illustrating how one of the transmitters may be controlled by signals received by wire from all of the transmitters in order to compensate for drift in frequency and phase by the various transmitters.

As shown in Fig. 2, the synchronizing generator 5 may include a frequency generator 14 labeled GE, which may be the same as the generators 1 to 4 except that its frequency may be controlled or regulated to compensate for frequency drift in the various generators including generators 1 to 4 inclusive. It may also be provided with a phase shifter 15 in the connection 20 between the generator 14 and the amplifier 10. A two-phase asynchronous servo-motor 21, having a shaft 22 driving a shaft 23 preferably through a gear reduction mechanism (not shown), may operate the phase shifter 15 to shift the phase of the signal supplied from the generator 14 to the amplifier 10. The motor 21 may also drive a shaft 24 which, for example, mechanically varies an element of the frequency-determining circuit, such as a variable condenser (not shown) in the generator 14, to vary the frequency generated thereby. As stated above, the frequency operator 12 derives two currents from the signals supplied thereto from generators 1 to 5 inclusive. As long as these two currents are equal in phase and frequency, i. e., as long as the above-given relations $$F_a - F_b = K_1 F_1 + K_2 F_2 \ldots + K_n F_n = 0$$

and $$\phi_a - \phi_b = K_1 \phi_1 + K_2 \phi_2 \ldots + K_n \phi_n = 0$$

are satisfied, at a predetermined point in the system so as to produce the two currents of equal phase and frequency, the shaft 22 of the motor 21 does not rotate. When, however, these relations are not satisfied because of a phase or frequency drift in any of the generators, the rotor of the motor 21 will rotate and the mechanical connections to the generator 14 and the phase shifter 15 can be arranged to vary the frequency and phase of the generator 5 to again satisfy the above relations. The shaft of the motor then stops. The frequency operator 12 of Fig. 2 and synchronizing generator 5 thus constitute a feed-back loop or follow-up mechanism which keeps the system constantly in synchronism so as to satisfy the above relations. This is accomplished by adjusting the phase or frequency or both of one generator and maintains the two currents derived from the five generated frequencies by a frequency operator anywhere in the system at the same frequency.

The system of Figs. 1 and 3 is similar to the system of Fig. 2, except that the signal energy supplied to the frequency operator 12 is received by the receiving aerial $R_r$ from the transmitting aerials A to E inclusive by transmission of radio waves instead of through wires, and the two currents derived from the signals by the frequency operator 12 are supplied by wires 26 to the servo-motor 21. In Fig. 3, one of the generators 1 to 4 of Fig. 1 and one of the amplifiers 6 to 9 respectively of Fig. 1 form part of each of the transmitters labeled TR, which feed the transmitting aerials A to D.

Fig. 4 is a block diagram showing the mobile receiver of Fig. 1 in greater detail. This receiver includes a frequency operator 12 which derives the two currents having the frequencies $F_a$ and $F_b$ referred to above.

The frequency operator includes an amplifying filter 30 labeled AF which receives the signals from the receiving aerial R.

For the frequencies, $$F_A = 1{,}499{,}470 \text{ cycles}$$
$$F_B = 1{,}500{,}500 \text{ cycles}$$
$$F_C = 1{,}500{,}330 \text{ cycles}$$
$$F_D = 1{,}499{,}700 \text{ cycles, and}$$
$$F_E = 1{,}500{,}000 \text{ cycles}$$

which were referred to above and which may be radiated from the transmitting aerials A to E respectively, this amplifying filter may pass a band of 15 and ±10 kilocycles so as to pass the frequencies just mentioned. The receiver may also include an oscillator 31 labeled HE which supplies a heterodyne frequency of 1,972 kilocycles. The frequency operator 12 also includes a mixer 32 labeled MI to which is delivered all of the frequencies passed by the amplifying filter 30 and also the heterodyne frequency from the oscillator 31. The output of the mixer 32 may be delivered to an amplifying filter 33 which may pass a band of frequencies of 472±2 kilocycles. This amplifying filter 33 passes only the difference frequencies between the heterodyne frequency of 1,972 kilocycles and the frequencies radiated from the aerials A to E and passed by the amplifying filter 30. That is to say, the output of the amplifying filter 30 contains the following frequencies: 472,530; 471,500; 471,670; 472,300 and 472,000 cycles. These frequencies are delivered to another mixer 34 and the output thereof delivered to two amplifying filters 35 and 36. Amplifying filter 35 passes a band of 515±50 cycles. That is, it passes the difference frequencies between 472,000 cycles on the one hand and 472,530 and 471,500 cycles on the other hand, which difference frequencies are 530 and 500 cycles respectively. The amplifying filter 36 passes a band of 315±50 cycles. That is, it passes the difference frequencies between 472,000 cycles on the one hand and 471,670 and 472,300 on the other hand, which difference frequencies are 330 and 300 cycles respectively.

The output from the amplifying filter 35 is delivered to another mixer 37 and the output of the amplifying filter 36 is delivered to another mixer 38. The output of the mixer 37 is delivered to an amplifying filter 39 which passes a band of 30±20 cycles. That is, it passes the difference frequency between 530 and 500 cycles, or 30 cycles. Similarly, the amplifying filter 40 passes a band of 30±20 cycles. That is, it passes a difference frequency between 330 and 300 cycles, or 30 cycles. The outputs of amplifying filters 39 and 40 are the two currents of equal frequency $F_a$ and $F_b$.

The mobile receiver also includes a phasemeter 13 by which the relative phase $\phi_s$ of the two currents $F_a$ and $F_b$ of equal frequency, namely, 30 cycles, is indicated.

That the phase difference $\phi_s$ between these two currents is a function of the frequencies transmitted and received, the arrangement of the transmitting aerials and the distances of the mobile receiver from the transmitting aerials is easily shown.

The five transmitted frequencies given above respond to the relation $K_1 F_1 + K_2 F_2 \ldots K_n F_n = 0$. That is to say, if the frequencies transmitted from the aerials A to D inclusive are each multiplied by $-1$ and the frequency transmitted by the aerial E is multiplied by $+4$, the relation is satisfied. In this specific example, the frequency of 1,500,000 cycles transmitted by the aerial E is the average of the other four transmitted frequencies and is the characteristic frequency of the system.

If one of the transmitted frequencies, for example, the frequency transmitted by the aerial A, namely, 1,499,470 cycles, varies a few cycles, for example, it increases to 1,499,472 cycles, it will be found by tracing the frequencies through the frequency operator 12 that the difference in frequency between the two derived frequencies $F_a$ and $F_b$ will equal 2, i. e., $F_a - F_b$ equal 2. It will also be true that $K_1 F_1 + K_2 F_2 \ldots + K_n F_n = 2$ such that the relation $$F_a - F_b = K_1 F_1 + K_2 F_2 \ldots K_n F_n$$

is still satisfied. This is a general proposition which will always be found true of the frequencies employed in the present invention. The value of both sides of the last-written expression can be made zero, for example, by compensatingly varying the frequency of one of the generators such as by increasing the frequency transmitted by the aerial A by one-half cycle, i. e., to 1,500,000.5 cycles.

The relation (1)
$$\phi_a - \phi_b = -\frac{2\pi V}{D}(K_1 F_1 D_1 + K_2 F_2 D_2 \ldots + K_n F_n D_n) + C$$

can be derived from the relation (2)     $F_a - F_b = K_1 F_1 + K_2 F_2 \ldots + K_n F_n$ as follows.

The frequency F of any signal is the rate of change with respect to time of the phase $\phi$ of that signal. That is to say $$F = \frac{d\phi}{dt}$$

or it can be generally stated that (3)     $\phi = \int F dt + C$ where C is a constant associated with the apparatus employed.

Integrating both sides of (2) in accordance with (3) gives (4)     $\phi_a - \phi_b = K_1 \phi_1 + K_2 \phi_2 \ldots K_n \phi_n + C$ This relation in common with (2) and (3) is currents of equal frequency and the phase of relation between the phases of the two derived valid anywhere in the system and gives the signals.

At the transmitters (5)     $\phi_a - \phi_b = K_1 \phi_{1e} + K_2 \phi_{2e} \ldots + K_n \phi_{ne} + C_e$ where $\phi_{1e}, \phi_{2e} \ldots \phi_{ne}$ are the phases of the signals at the transmitters and $C_e$ is a constant associated with the transmitters. The phase difference $\phi_a - \phi_b$ can be made zero at any point in the system, for example, a point at or near one of the transmitters, by adjusting one of the phases $\phi_{1e}, \phi_{2e} \ldots \phi_{ne}$ such that (6)     $K_1 \phi_{1e} + K_2 \phi_{2e} \ldots + K_n \phi_{ne} = -C_e$ Relation 4 is also valid at the receiving point such that at the receiver (7)     $\phi_a - \phi_b = K_1 \phi_{1r} + K_2 \phi_{2r} \ldots K_n \phi_{nr} + C_r$ where $\phi_{1r}, \phi_{2r} \ldots \phi_{nr}$ are the phases of the various signals at the receiving point and $C_r$ is a constant associated with the receiver.

However, (8)
$$\phi_{1r} = \phi_{1e} - \frac{2\pi F_1 D_1}{V}$$

$$\phi_{2r} = \phi_{2e} - \frac{2\pi F_2 D_2}{V}$$

$$\phi_{nr} = \phi_{ne} - \frac{2\pi F_n D_n}{V}$$

where $D_1, D_2 \ldots D_n$ are the respective distances from the transmitters to the receiver and $V$ is the velocity of propagation.

Combining Relations 8 with Relations 7 gives (9)
$$\phi_a - \phi_b = K_1\phi_{1e} - \frac{2\pi K_1 F_1 D_1}{V} + K_2\phi_{2e} - \frac{2\pi K_2 F_2 D_2}{V} \ldots + K_n\phi_{ne} - \frac{2\pi K_n F_n D_n}{V} + C_r$$

But (6)   $K_1\phi_{1e} + K_2\phi_{2e} \ldots + K_n\phi_{ne} = -C_e$

Therefore

(10)
$$\phi_a - \phi_b = \frac{-2\pi}{V}(K_1 F_1 D_1 + K_2 F_2 D^2 \ldots + K_n F_n D_n) + C_r - C_e$$

or (1)
$$\phi_a - \phi_b = -\frac{2\pi}{V}(K_1 F_1 D_1 + K_2 F_2 D_2 \ldots + K_n F_n D_n) + C$$

That is to say, the phase difference $\phi_s = \phi_a - \phi_b$ between the two derived currents of equal frequency at the receiver is a function of the transmitted frequencies and the distances of the receiver from the transmitting aerials. The constant $C$ represents a phase and can be made zero or given any desired value by adjusting the phase of any signal in the system, for example, by adjusting the phase shifter 15.

It is known that a radio signal having a frequency of 1,500,000 cycles travelling through a distance D expressed in kilometers undergoes a negative phase shift equal in degrees to $-1,800 D$. Thus, in the present example the relative phase shift $\phi_s$ expressed in degrees will be given approximately by the expression:

$$\phi_s = 1,800(D_A + D_B + D_C + D_D - D_E)$$

in which $D_A, D_B, D_C, D_D, D_E$ designate the distances expressed in kilometers which separate the receiver from each of the transmitters A, B, C, D, E.

It can be shown that when the distance $D_E$ between the centrally positioned transmitting aerial E and the mobile receiver exceeds a few kilometers, the phase shift $\phi_s$ between the two derived currents having the frequencies $F_a$ and $F_b$ from the frequency operator 12 of the mobile receiver is approximately equal to $$\frac{1,800}{D_E}$$

That is to say, $$\phi_s = \frac{1,800}{D_E}$$

and the equiphase lines are approximately concentric circles having centers at the location of the transmitting aerial E.

Figure 6:
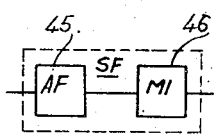
Fig. 6 is a block diagram of a portion of a receiver in accordance with the present invention which may be termed "a subtraction filter."

Fig. 5 is a block diagram of an elementary system employing four signals radiated from four aerials A', B', C' and D'. The transmitting station, labeled MG, includes a synchronizing generator 1' which may be similar to the synchronizing generator 5 of Figs. 1 and 3. It also includes three independent generators 2', 3' and 4', the generators 1' to 4' inclusive feeding the aerials A' to D' respectively. The transmitting station is also provided with a receiver having an aerial $R_r$ of fixed location and may have a frequency operator 42. The system of Fig. 5 also has a mobile receiver labeled MP and having an aerial R and a frequency operator 42 which may be the same as the frequency operator 42 of the receiver of fixed location. These frequency operators include two circuits 43 and 44 labeled SF which may be termed "subtraction filters." As shown in Fig. 6, each subtraction filter may include an amplifying filter 45 and a mixer 46. In each instance, the two subtraction filters 43 and 44 have signals delivered thereto from a receiving aerial.

The frequency operator 42 is also provided with two amplifying filters 47 and 48 to which are delivered the outputs of the subtraction filters 43 and 44 respectively. The outputs of the amplifying filters 47 and 48 are two currents of equal frequency when the system is in synchronism. In the case of the mobile receiver, the two currents are fed to a phasemeter 49 which indicates the difference in phase between the two currents. In the case of the receiver of fixed location, the two currents are fed by the lines 51 to the synchronizing generator 1' in order to insure that the relations $$F_a - F_b = K_1 F_1 + K_2 F_2 \ldots + K_n F_n = 0$$

and $$\phi_a - \phi_b = K_1\phi_1 + K_2\phi_2 \ldots + K_n\phi_n + C$$

are satisfied as explained with reference to Figs. 1 and 4.

As a specific example, the signals radiated from the aerials A' to D' respectively and the corresponding values of K may be as follows:

$F_1 = 520,020$     $K = +1$
$F_2 = 520,000$     $K = -1$
$F_3 = 500,020$     $K = +1$
$F_4 = 500,000$     $K = -1$

All of these signals are received by the aerial R of the mobile receiver. The amplifying filter 45 (Fig. 6) of the subtraction filter 43 (Fig. 5) passes the frequencies $F_1$ and $F_2$ and these are mixed in the mixer 46 (Fig. 6). The amplifying filter 47 (Fig. 5) passes the difference frequency of 20 cycles. Similarly, the subtraction filter 44 passes and mixes the frequencies $F_3$ and $F_4$ and the amplifying filter 48 passes the resulting difference frequency of 20 cycles. The resulting two currents, each of 20 cycles, are delivered to the phasemeter 49 and the phase difference $\phi_s$ indicated thereby. When $\phi_s$ is expressed in degrees, $$\phi_s = \frac{-360}{V}(K_1 F_1 D_1 + K_2 F_2 D_2 + K_3 F_3 D_3 + K_4 F_4 D_4)$$

where $D_1$ to $D_4$ are the distances between the aerial R of the mobile receiver and the transmitting aerials A' to D' respectively. The above relation may be put in the approximate form $$\phi_s = \frac{-360 F_c}{V}(K_1 D_1 + K_2 D_2 + K_3 D_3 + K_4 D_4)$$

where $F_c$ is the characteristic frequency of the system and is approximately 500 kilocycles. This makes the value of the coefficient $$\frac{360 F_c}{V}$$

equal to 0.6° per meter.

The frequency operator 43 of the transmitting station operates in the same manner as that of the mobile receiver and, as stated above, furnishes two currents to the synchronizing generator 1' to maintain the system in synchronism.

Fig. 7 illustrates another type of receiver, the frequency operator circuits of which may be employed for either the fixed receiver or the mobile receiver of Fig. 5. In this figure, the signals received by a receiving aerial from the transmitting aerials are delivered through a line 50 to a mixer 53. A heterodyne frequency from an oscillator 52 is also delivered to the mixer 53. The output of the mixer 53 is delivered to two subtraction filters 43' and 44' of the general type illustrated in Fig. 6, and the outputs of these subtraction filters are delivered to the amplifying filters 47 and 48 respectively which in turn deliver two currents of equal frequency to the phasemeter 49.

As a specific example, the four frequencies radiated by the four transmitting aerials and their corresponding values of K may be as follows:

$F_1 = 1,000,320$ cycles   $K_1 = +1$
$F_2 = 1,000,300$ cycles   $K_2 = -1$
$F_3 = 1,000,220$ cycles   $K_3 = -1$
$F_4 = 1,000,200$ cycles   $K_4 = +1$ The frequency H generated by the oscillator 52, may be 1 megacycle.

The mixer 53 performs the following subtractions of frequencies:

$$F_1 - H, F_2 - H, F_3 - H, F_4 - H$$

and produces, therefore, currents having the following frequencies respectively:

$$f_1 = 320 \text{ c.}; f_2 = 300 \text{ c.}; f_3 = 220 \text{ c.}; f_4 = 200 \text{ c.}$$

The subtraction filter 43' selects the frequencies $f_1$ and $f_2$ and mixes these frequencies to produce a difference frequency of 20 cycles so as to deliver a current of this frequency to the phasemeter 49. The subtraction filter 44' selects the frequencies $f_3$ and $f_4$ and mixes these frequencies. The amplifying filter 48 passes the difference frequency of 20 cycles and delivers another current of this frequency to the phasemeter 49.

In the above-described systems employing four signals, the signal frequencies have been composed of pairs of frequencies in which the frequencies of each pair have been close to each other but in which the average frequencies of the pairs of frequencies are quite different. The receiver of Fig. 8 is adapted to operate with signals having frequencies which need not have the above-mentioned relation to each other. In accordance with Fig. 8, signals of four different frequencies may be received by four receiving aerials and delivered through the lines 54ª, 54ᵇ, 55ª and 55ᵇ respectively. A heterodyne frequency may also be delivered to the mixers 57ª and 58ª from the oscillator 56ª and, similarly, a heterodyne frequency may be delivered to the mixers 57ᵇ and 58ᵇ from an oscillator 56ᵇ. The two heterodyne frequencies from the oscillators 56ª and 56ᵇ may be different frequencies, although in some instances they may be the same frequency, in which case a single oscillator may be employed. The outputs of the mixers 57ª and 57ᵇ may be delivered to a subtraction filter 59, which passes and mixes two frequencies from the mixers 57ª and 57ᵇ. Similarly, the outputs from the receivers 58ª and 58ᵇ are delivered to a subtraction filter 61 which passes and mixes two frequencies from the mixers 58ª and 58ᵇ. The amplifying filter 60 passes a selected frequency from the subtraction filter 59 and the amplifyng filter 62 passes a selected frequency from the subtraction filter 61. Two currents can thus be delivered to the phasemeter 63. These currents can be selected to have the same frequency if the relation of the received signals satisfies the relation $$F_1 K_1 + F_2 K_2 + F_3 K_3 + F_4 K! = 0$$

In this particular case, the values of K for two of the frequencies will be +1 and for the other two frequencies will be -1.

As a specific example, the values of the various transmitted frequencies and their corresponding values of K may be $F_1 = 17.5$ kc.   $K_1 = +1$
$F_2 = 14.5$ kc.   $K_2 = -1$
$F_3 = 15.5$ kc.   $K_3 = -1$
$F_4 = 12.5$ kc.   $K_4 = +1$ The values of the heterodyne frequencies $H_a$ and $H_b$ from the oscillators 56ª and 56ᵇ may be $H_a = 97.5$ kc. $+ 10$ cycles
$H_b = 99.5$ kc. $- 10$ cycles Mixer 57ª produces a frequency which is the sum of $H_a$ and $F_1$ or 115,010 cycles. Mixer 57ᵇ produces a frequency which is the sum of $H_b$ and $F_3$ or 114,990 cycles. These two frequencies are selected and mixed by the subtraction filter 59 to produce a difference frequency of 20 cycles, which is passed by the amplifying filter 60, and a current of this frequency delivered to the phasemeter 63.

Mixer 58ª produces a frequency which is the sum of $H_a$ and $F_2$ or 112,010 cycles. Mixer 58ᵇ produces a frequency which is the sum of $H_b$ and $F_4$ or 111,990 cycles. These two frequencies are selected and mixed by the subtraction filter 61 to produce a difference frequency of 20 cycles. This frequency is passed by the amplifying filter 62 to deliver a current of this frequency to the phasemeter 63.

Fig. 9 differs from Fig. 8 only in that a servo-motor 64 is substituted for the phasemeter 63 and through a mechanical connection indicated at 65 the servo-motor drives a phase shifter 66 positioned in the line delivering the heterodyne frequency from the oscillator 56ᵇ to the mixer 58ᵇ. The mechanical connection preferably includes a gear reduction mechanism (not shown).

The receiver of Fig. 9 operates as a follow-up system. The shaft of the motor 64 takes a position which is such that the phase difference between the currents which feed the servo-motor 64 is zero and this position indicates the value of the phase difference.

It is to be noted that the phase shifter 66 could be interposed in other circuits, for example, any one of the input circuits of the devices 57ª, 57ᵇ, 58ª, 58ᵇ, 59 and 61, but it is generally of advantage to act on a locally generated current since its frequency may be made stable and free of harmonics.

The phase shifter 66 and the servo-motor 64 may be similar to the servo-motor and phase shifter described with reference to Figs. 2 and 3.

Fig. 10 shows a receiver which is similar to that of Fig. 8. In this figure the mixer 67ª replaces the mixers 57ª and 58ª of Fig. 8 and the mixer 67ᵇ replaces the mixers 57ᵇ and 58ᵇ of Fig. 8. All of the signals from a single aerial are delivered by a line 68 to both the mixers 67ª and 67ᵇ instead of being delivered separately to each of the mixers as in Fig. 8. Assuming the same frequencies given in the specific example discussed with respect to Fig. 8, the mixer 67a will now produce the two frequencies of 115,010 and 112,010 produced in the two mixers 57a and 58a, and the mixer 67b will now produce the two frequencies of 114,990 and 111,990 produced in the two mixers 57b and 58b, respectively, of Fig. 8. The subtraction filter 59 of Fig. 10 will select the two frequencies of 115,010 and 114,990 and mix them to produce a difference frequency of 20 cycles in the same manner as the subtraction filter 59 of Fig. 8. Also the subtraction filter 61 of Fig. 10 will select the two frequencies of 112,010 and 111,990 and mix them to produce a difference frequency of 20 cycles, in the same manner this is accomplished by the subtraction filter 61 of Fig. 8. Otherwise the receivers of Figs. 8 and 10 are the same and operate in the same manner.

Fig. 11 gives an example of the pattern of equiphase lines which may be obtained from the transmitting station of Fig. 5. In Fig. 11, A', B', C', D', $R_r$ and R designate the supposed locations of the various aerials. It is assumed that the frequencies $F_1$, $F_2$, $F_3$ and $F_4$ supplied by the generators 1', 2', 3' and 4' respectively and the corresponding values of K are:

$F_1 = 520,020$      $K = +1$
$F_2 = 520,000$      $K = -1$
$F_3 = 590,020$      $K = -1$
$F_4 = 590,000$      $K = +1$

In this case the phase difference between the two currents derived from these signals is $$\phi_s = \frac{2\pi}{V}(F_1 D_1 - F_2 D_2 - F_3 D_3 + F_4 D_4)$$

where $D_1$ to $D_4$ and the respective distances from the transmitting aerials to the mobile receiver. This may be expressed as follows:

$$\phi_s = \frac{2\pi}{V} \cdot 510,000 \; (D_1 - D_2 - D_3 + D_4)$$

such that the characteristic frequency is 510,000 cycles.

Fig. 12 gives an example of another pattern of equiphase lines which may be obtained from the transmitter of Fig. 5 transmitting the same frequencies, if the aerial C' is omitted and the aerial B' is fed by both the generators 2' and 3'. In this case the three transmitting aerials are positioned in a straight line with the aerial B' located half way between the aerials A' and D'.

Fig. 13 shows an example of the equiphase lines obtained from the transmitter of Fig. 5 if the aerials C' and D' are omitted, the aerial A' fed from both the generators 1' and 4' and the aerial B' fed from both the generators 2' and 3'. In this case, $D_1$ equals $D_4$ and $D_2$ equals $D_3$ and the approximate value of $\phi_s$ (assuming the same values of transmitted frequencies assumed with reference to Fig. 11) is as follows:

$$\phi_s = \frac{2\pi}{V} \cdot 1,020,020 \; (D_1 - D_2)$$

such that the characteristic frequency is 1,020,020 cycles and the equiphase lines are simple hyperbolas.

Fig. 14 shows an example of the pattern of equiphase lines obtained from the transmitters of Fig. 5 when the aerials C' and D' are omitted and the aerial A' fed by both the generators 1' and 3', and the aerial B' is fed from both the generators 2' and 4'. In this case $D_1$ equals $D_3$ and $D_2$ equals $D_4$ and the approximate value of $\phi_s$ is $$\phi_s = \frac{2\pi}{V} \cdot 20,000 \; (D_1 - D^2)$$

such that the characteristic frequency is 20,000 cycles.

According to a last modification of the system shown in Fig. 5 the aerial D' is omitted; the aerial A' is fed by the generator 1' and thus sends out the signal of frequency $F_1$; the aerial B' is fed by the generator 2' and thus sends out the signal of frequency $F_2$ and, lastly, the aerial C' is fed by both generators 3' and 4' and thus sends out both signals of frequencies $F_3$ and $F_4$.

In this case $D_2$ equals $D_4$ and the approximate value of $\phi_s$ is $$\phi_s = \frac{2\pi}{V} \cdot 520,000 \; (D_1 - D_2)$$

such that the characteristic frequency is 520,000 cycles. The distances $D_3$ and $D_4$ do not appear in this approximate expression, which means that the aerial transmitting the signals of the frequencies $F_3$ and $F_4$ can occupy any position, for example, the position of either of the aerials A' or B'. From the above, it is apparent that the characteristic frequency of a system depends upon the number of transmitting aerials employed to transmit the various signals.

*Multiple and complete systems*

As stated above, the invention contemplates multiple systems made up of a plurality of elementary systems which provide a plurality of patterns of equiphase lines of the same shape but having different spacings between the lines. Thus, for example, any number of such elementary systems in which the spacings between equiphase lines are proportional to 1, 10, 100, etc., may be employed to resolve the ambiguity as to which of the equiphase lines passes through the aerial of the mobile receiver.

The invention also contemplates the employment of a plurality of elementary systems or a plurality of multiple systems to provide a plurality of patterns of intersecting equiphase lines in order to resolve the ambiguity as to the position of the aerial of the mobile receiver on a given equiphase line.

A specific example of a system involving two multiple systems to produce a complete system may be as follows:

The transmitting station may include three spaced aerials A, B and C arranged so that the signals from the aerials A and B provide three patterns of superimposed, parallel equiphase lines in which the spacings between the lines in the second and third patterns are respectively 1/10 and 1/100 of those of the first pattern. Also the signals from the aerials A and C provide three similar patterns of equiphase lines intersecting those from the aerials A and B.

According to this example, 12 generators produce 12 signals having the following frequencies respectively:

| | | |
|---|---|---|
| $F_{A1} = 16,000$ c. | $F_{B1} = 15,800$ c. | $F_{C1} = 15,600$ c. |
| $F_{A2} = 14,000$ c. | $F_{B2} = 14,200$ c. | $F_{C2} = 14,400$ c. |
| $F_{A3} = 13,000$ c. | $F_{B3} = 12,800$ c. | $F_{C3} = 12,600$ c. |
| $F_{A4} = 15,700$ c. | $F_{B4} = 15,500$ c. | $F_{C4} = 15,300$ c. |

The signals having the frequencies indicated by the subscript A in the above list are radiated from the aerial A and, similarly, the frequencies indicated by the subscripts B and C are radiated from the aerials B and C respectively.

From the above list of frequencies, six groups of frequencies, all of which satisfy the relation $$K_1F_1+K_2F_2+K_3F_3+K_4F_4=0$$

may be selected. This relation may be maintained by regulating one or more of the generators supplying a frequency in each group in accordance with the principles discussed above. Two currents of equal frequency can be derived from each group of currents and their phase differences determined.

One group $G_1$ formed of the four currents having the frequencies $F_{A1}$, $F_{A2}$, $F_{B1}$, $F_{B2}$ may have values of K of $+1$, $+1$, $-1$, $-1$ respectively, the above relation being maintained by regulation of the generator supplying the current of frequency $F_{B2}$.

A second group $G_2$ formed of the four currents having the frequencies $F_{A1}$, $F_{A3}$, $F_{B1}$, $F_{B3}$ may have values of K of $+1$, $-1$, $-1$, $+1$ respectively, the above relation being maintained by regulation of the generater supplying the current of frequency $F_{B3}$.

A third group $G_3$ formed of the four currents having the frequencies $F_{A1}$, $F_{A4}$, $F_{B1}$, $F_{B4}$ having values of K of $+1$, $-1$, $-1$, $+1$ respectively, the above relation being maintained by regulation of the generator supplying the current of frequency $F_{B4}$.

A fourth group $G_4$ formed of the four currents having the frequencies $F_{A1}$, $F_{A2}$, $F_{C1}$, $F_{C2}$ having values of K of $+1$, $+1$, $-1$, $-1$ respectively, the above relation being maintained by regulation of the generator supplying the current of frequency $F_{C2}$.

A fifth group $G_5$ formed of the four currents having the frequencies $F_{A1}$, $F_{A3}$, $F_{C1}$, $F_{C3}$ having values of K of $+1$, $-1$, $-1$, $+1$ respectively, the above relation being maintained by regulation of the generator supplying the current of frequency $F_{C3}$.

A sixth group $G_6$ formed of the four currents having the frequencies $F_{A1}$, $F_{A4}$, $F_{C1}$, $F_{C4}$ having values of K of $+1$, $-1$, $-1$, $+1$ respectively, the above relation being maintained by regulation of the generator supplying the current of frequency $F_{C4}$.

The mobile receiving station receivers include frequency operators deriving two currents of equal frequency from each of the six groups of signals $G_1$ to $G_6$ and measure their phase differences to obtain $\phi_{s1}$ to $\phi_{s6}$. These phase differences are related to the position of the mobile receiver approximately as follows:

$\phi_{s1}=-36\ (D_A-D_B)$    $\phi_{s4}=-36\ (D_A-D_C)$
$\phi_{s2}=-3.6\ (D_A-D_B)$    $\phi_{s5}=-3.6\ (D_A-D_C)$
$\phi_{s3}=-0.36\ (D_A-D_B)$    $\phi_{s6}=-0.36\ (D_A-D_C)$ $D_A$, $D_B$, $D_C$ being the distances expressed in kilometres which separate the mobile receiver from the transmitting aerials A, B, C respectively and the values $\phi_s$ being expressed in degrees.

The system just described, therefore, is a complete system which includes six elementary systems divided into two multiple systems, one of which provides three determinations of different magnitude of the distance of the mobile receiver from the aerials A and B and the other of which provides three determinations of different magnitude of the distance of the mobile receiver from the aerials A and C. The position of the mobile receiver can thus be determined with accuracy and without ambiguity.

It is to be noted that the six groups $G_1$ to $G_6$ of four signals each are obtained from twelve signals instead of twenty-four thus enabling less apparatus and a narrower frequency band to be employed.

It will also be noted that the frequencies of the signals transmitted from aerial A satisfy the following relations:

$$F_{A1}+F_{A2}=30{,}000 \text{ cycles}$$
$$F_{A1}-F_{A3}=3{,}000 \text{ cycles}$$
$$F_{A1}-F_{A4}=300 \text{ cycles}$$

The same is true of the signals transmitted from aerial B and of the signals transmitted from aerial C. These are the characteristic frequencies associated with the three elementary systems respectively of each multiple system of the present example.

It is to be noted that three additional groups of four signals satisfying the relation $$K_1F_1+K_2F_2+K_3F_3+K_4F_4=0$$

can be obtained from the above list of twelve signals. Such groups of signals are as follows:

Group $G_7$—$F_{B1}$, $F_{B2}$, $F_{C1}$, $F_{C2}$
Group $G_8$—$F_{B1}$, $F_{B3}$, $F_{C1}$, $F_{C3}$
Group $G_9$—$F_{B1}$, $F_{B4}$, $F_{C1}$, $F_{C4}$ From these additional groups another set of three elementary systems giving three patterns of equiphase lines of different spacings intersecting the other two patterns may be obtained, if desired. It is to be noted that no further regulation of any of the frequency generators will be required as two of the generators furnishing a frequency in each of the three additional groups are already subject to regulation.

*Application to the long range navigation*

Figure 15:
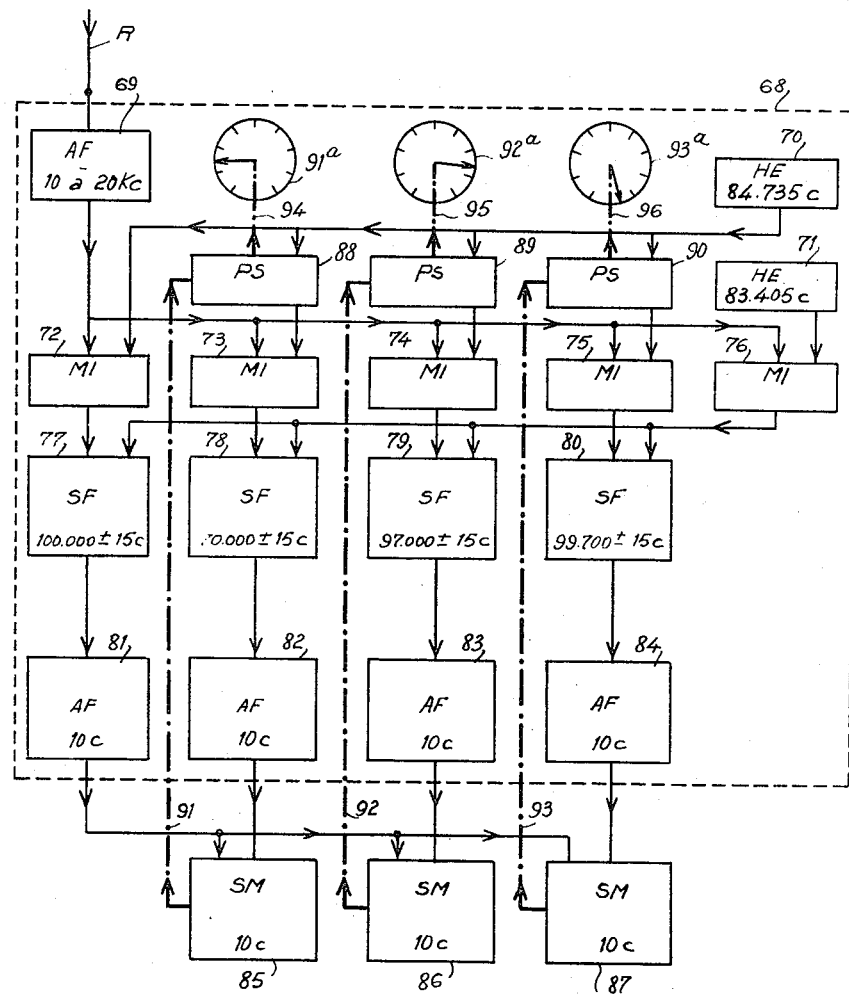
Fig. 15 is a block diagram of receiver suitable for employment in a long-range combined system.
Figure 16:
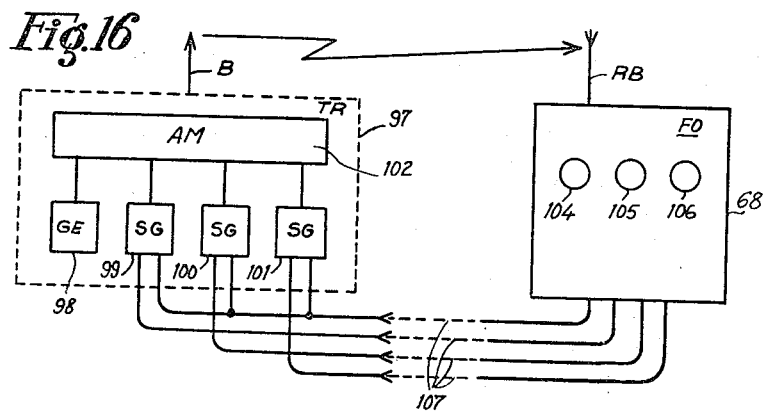
Fig. 16 is a block diagram of a transmitter suitable for employment with the receiver of Fig. 15 in a long-range combined system.
Figure 17:
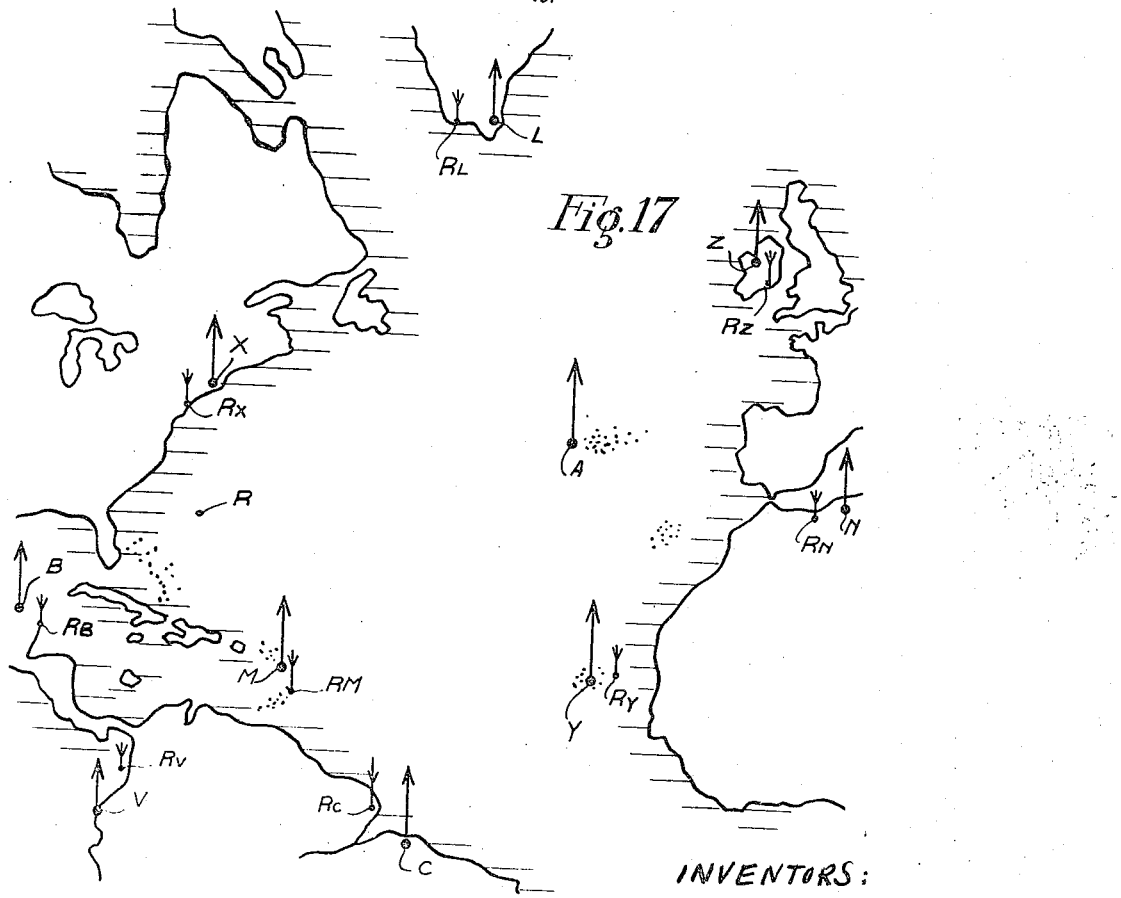
Fig. 17 is a map showing an example of suitable locations of the transmitting stations in a long-range combined system.

The complete system shown in Figs. 15 to 17 may include 25 stationary transmitting stations which are called respectively station A, station B, ... station Z omitting one letter of the alphabet, for example, J, and each of which comprises an aerial called aerial A, aerial B ... aerial Z respectively. The various transmitting stations may be positioned at considerable distances from each other, for example, they may be distributed over a wide area as shown in Fig. 17 which is a map of the Atlantic Ocean indicating appropriate locations for ten transmitting stations, the remaining 15 being positioned in other parts of the world.

Each of these aerials transmits in the form of four pure undamped waves four signals.

The system is based on four basic frequencies, $F_1$, $F_2$, $F_3$ and $F_4$ which have the following relation to each other:

$$F_1+F_2=30{,}000 \text{ cycles}$$
$$F_1-F_3=3000 \text{ cycles}$$
$$F_1-F_4=300 \text{ cycles}$$

In the present example, the following basic frequencies have been chosen:

$$F_1=15{,}030 \text{ c.}$$
$$F_2=14{,}970 \text{ c.}$$
$$F_3=12{,}030 \text{ c.}$$
$$F_4=14{,}730 \text{ c.}$$

The four signals transmitted by station A are derived from the basic frequencies as follows:

$$F_{A1}=F_1+f_A$$
$$F_{A2}=F_2-f_A$$
$$F_{A3}=F_3+f_A$$
$$F_{A4}=F_4+f_A$$

Similarly, the frequencies of the signals transmitted from station B are derived as follows:

$$F_{B1} = F_1 + f_B$$
$$F_{B2} = F_2 - f_B$$
$$F_{B3} = F_3 + f_B$$
$$F_{B4} = F_4 + f_B$$

A similar derivation is employed for the remaining stations. Also the factors $f_A$ to $f_Z$ were chosen as follows:

$$f_A = 120 \text{ c.}$$
$$f_B = 240 \text{ c.}$$
$$f_C = 360 \text{ c.}$$
$$\ldots\ldots\ldots$$
$$f_M = 1,560 \text{ c.}$$
$$\ldots\ldots\ldots$$
$$f_Z = 3,000 \text{ c.}$$

Thus station A transmits signals having the following frequencies:

$$F_{A1} = 15,030 + 120 = 15,150 \text{ cycles}$$
$$F_{A2} = 14,970 - 120 = 14,850 \text{ cycles}$$
$$F_{A3} = 12,030 + 120 = 12,150 \text{ cycles}$$
$$F_{A4} = 14,730 + 120 = 14,850 \text{ cycles}$$

The fact that two of the frequencies associated with station A are equal is an unusual case which is not, in general, true of the other stations. This fact does not affect the operation of the system, and frequencies could have been chosen so that such condition would not exist. The important consideration is that no two of the stations transmit any signals of the same frequency.

Station B transmits signals having the following frequencies:

$$F_{B1} = 15,030 + 240 = 15,270 \text{ c.}$$
$$F_{B2} = 15,970 - 240 = 14,730 \text{ c.}$$
$$F_{B3} = 12,030 + 240 = 12,270 \text{ c.}$$
$$F_{B4} = 14,730 + 240 = 14,970 \text{ c.}$$

Station M transmits signals having the following frequencies:

$$F_{M1} = 15,030 + 1,560 = 16,590 \text{ c.}$$
$$F_{M2} = 14,970 - 1,560 = 13,410 \text{ c.}$$
$$F_{M3} = 12,030 + 1,560 = 13,590 \text{ c.}$$
$$F_{M4} = 14,730 + 1,560 = 16,290 \text{ c.}$$

The following three groups of signals with their corresponding values of K can be selected from the signals transmitted from stations B and M:

Group $G_{BM1}$—
$$F_{B1} = 15,270 \text{ cycles } K_{B1} = +1$$
$$F_{B2} = 14,730 \text{ cycles } K_{B2} = +1$$
$$F_{M1} = 16,590 \text{ cycles } K_{M1} = -1$$
$$F_{M2} = 13,410 \text{ cycles } K_{M2} = -1$$

Group $G_{BM2}$—
$$F_{B1} = 15,270 \text{ cycles } K_{B1} = +1$$
$$F_{B3} = 12,270 \text{ cycles } K_{B3} = -1$$
$$F_{M1} = 16,590 \text{ cycles } K_{M1} = -1$$
$$F_{M3} = 13,590 \text{ cycles } K_{M3} = +1$$

Group $G_{BM3}$—
$$F_{B1} = 15,270 \text{ cycles } K_{B1} = +1$$
$$F_{B4} = 14,970 \text{ cycles } K_{B4} = -1$$
$$F_{M1} = 16,590 \text{ cycles } K_{M1} = -1$$
$$F_{M4} = 16,290 \text{ cycles } K_{M4} = +1$$

All of these groups of signals satisfy the relation $$K_1 F_1 + K_2 F_2 + K_3 F_3 + K_4 F_4 = 0$$

Thus two signals having the same frequency can be obtained from each group of signals and their phase differences obtained by a phasemeter. Three elementary systems having characteristic frequencies of 30,000; 3000 and 300 cycles are thus provided, the three elementary systems forming a multiple system.

Similarly, three groups of four currents providing a multiple system made up of three elementary systems with characteristic frequencies of 30,000; 3000 and 300 cycles can be obtained from the signals transmitted from any two transmitting stations in the combined system being described. Thus any three or more transmitting stations form a complete system free from ambiguity. The range of frequencies in this combined system of 25 transmitting stations is from 11,970 to 18,030 cycles or a band width of 6060 cycles, the frequencies being spaced 60 cycles apart so that approximately 100 frequencies are involved.

Fig. 15 is a block diagram showing the mobile receiver suitable for use in the present combined system. As will presently be seen this receiver may be adjusted to receive the signals from any two of the transmitting stations which will be supposed, by way of example, to be station B and station M.

The receiver shown in Fig. 15 includes an aerial R and a frequency operator 68 having an amplifying filter 69 passing a band ranging from 10 to 20 kilocycles. It passes all of the frequencies of the signals transmitted from all of the transmitting stations including stations B and M. It also has two tunable oscillators 70 and 71. The oscillator 70 delivers a heterodyne frequency to the mixer 72 and also to the mixers 73, 74 and 75 through the phase shifters 88, 89 and 90 respectively. When signals are being received from stations B and M, the heterodyne frequency from the oscillator 70 is $H' = 84,735$ cycles. Under these conditions, the oscillator 71 delivers a heterodyne frequency $H'' = 83,405$ cycles to the mixer 76 and the signals from the amplifying filter 69 are also delivered to all of the mixers 72 to 76 inclusive. The various mixers produce, among others, the following frequencies:

For 72: $F_1' = H' + F_{B1} = 100,005$ c.

For 73: $F_2' = H' - F_{B2} = 70,005$ c.

For 74: $F_3' = H' + F_{B3} = 97,005$ c.

For 75: $F_4' = H' + F_{B4} = 99,705$ c.

For 76: $\begin{cases} F_1'' = H'' + F_{M1} = 99,995 \text{ c.} \\ F_2'' = H'' - F_{M2} = 69,995 \text{ c.} \\ F_3'' = H'' + F_{M3} = 96,995 \text{ c.} \\ F_4'' = H'' + F_{M4} = 99,695 \text{ c.} \end{cases}$ The outputs of the mixers 72 to 75 inclusive are delivered to the subtraction filters 77 to 80 respectively, and the output of the mixer 76 is delivered to all of these subtraction filters. Subtraction filter 77 has a band pass of $100,000 \pm 15$ cycles and selects and mixes $F_1'$ and $F_1''$, i. e., the frequencies 100,005 and 99,995 cycles, to produce a difference frequency of 10 cycles. This is delivered to and passed by the amplifying filter 81. Subtraction filter 78 has a band pass of $70,000 \pm 15$ cycles and selects and mixes $F_2'$ and $F_2''$, i. e., the frequencies 70,005 and 69,995 cycles, to produce a difference frequency of 10 cycles which is delivered to and passed by the amplifying filter 82. Subtraction filter 79 has a band pass of $97,000 \pm 15$ cycles and selects and mixes $F_3'$ and $F_3''$, i. e., the frequencies 97,005 and 96,995 cycles, to produce a difference frequency of 10 cycles which is delivered to and passed by the amplifying filter 83. Subtraction filter 80 has a band pass of $99,700 \pm 15$ cycles and selects and mixes $F_4'$ and $F_4''$, i. e., the frequencies 99,705 and 99,695, to produce a difference frequency of 10 cycles which is delivered to and passed by amplifying filter 84.

The 10-cycle output current of the amplifying filter 81 is delivered to all of the servomotors 85 to 87 inclusive and the 10-cycle output currents of the amplifying filters 82, 83 and 84 are delivered to the servomotors 85, 86 and 87 respectively. These servomotors are mechanically connected by mechanical connections 91, 92 and 93 to the phase shifters 88, 89 and 90 respectively so as to shift the phase of the heterodyne frequency passed therethrough from the oscillator 70. The servomotors and phase shifters each take a position such that there is zero phase difference between the two currents supplied to each of the servomotors and these positions are indicated on the dials $91^a$, $92^a$ and $93^a$ respectively.

The indications of the dials $91^a$, $92^a$ and $93^a$ are respectively the phase differences between the two currents of equal frequency (10 cycles) derived from each of the three groups of frequencies $G_{BM1}$, $G_{BM2}$ and $G_{BM3}$ discussed above. The following relations can be derived:

$$\phi_{sBM1} = 36 \ (D_M - D_B)$$
$$\phi_{sBM2} = 3.6 \ (D_M - D_B)$$
$$\phi_{sBM3} = 0.36 \ (D_M - D_B)$$

where $D_M$ and $D_B$ are the distances in kilometers between the aerial of the mobile receiver and the aerials of the stations D and B respectively. It follows that the dials $91^a$, $92^a$ and $93^a$ can be calibrated in kilometers, tens of kilometers and hundreds of kilometers, or in any other distance units, and the distances can be read directly without ambiguity.

The receiver of Fig. 15 can be tuned to similar groups of frequencies from any two of the transmitting stations A to Z inclusive by adjusting the oscillators 70 and 71. Any two transmitting stations of the combined system constitute a multiple system. By employing two receivers or tuning a single receiver successively to groups of frequencies from two or more pairs of transmitting stations, a complete system giving a definite location for the mobile receiver is provided.

A block diagram of a suitable transmitting station is shown in Fig. 16. For convenience this will be assumed to be station B of Fig. 17. This station may include a transmitter 97 having an aerial B. It may also include an independent frequency generator 98 and three synchronizing generators 99, 100 and 101, all of the generators feeding a single amplifier 102, in turn feeding the aerial B. The transmitting station may also include a control receiver having an aerial RB of fixed location and a frequency operator 68 which may be the same as the frequency operator 68 of the receiver of Fig. 15 except that the phase shifters are manually set instead of being mechanically driven by the servomotors. In this case, the servomotors 85, 86 and 87 of Fig. 15 form part of the synchronizing generators 99, 100 and 101, respectively, of Fig. 16. Assuming that the station B is to be regulated from station M, the phase shifters of the frequency operator 68 of Fig. 16 are set and locked so that their dials 104, 105 and 106 indicate the distance $D_M - D_B$ above discussed, where $D_M$ and $D_B$ now refer to the distances between the aerial RB of the fixed receiver and the aerials of the stations B and M. The 10-cycle currents from the amplifying filters 81, 82, 83 and 84 of the frequency operator 68 are delivered to the servomotors of the synchronizing generators 99, 100 and 101 through lines 107 to regulate these generators. The frequency and phase of each of the frequencies $F_{B2}$, $F_{B3}$ and $F_{B4}$ can thus be regulated to maintain the frequency of the respective pairs of currents from the frequency operator 68 equal and their phase difference zero. Under these conditions, any mobile receiver tuned to these two stations will indicate the correct distances $D_M - D_B$ to the mobile receiver.

It is to be noted that no regulation receiver is shown in Fig. 17 for station A. This station, for example, may be the master station and all other stations may be regulated therefrom, either directly or indirectly from other stations regulated from station A. For example, stations L, M, N, X, Y and Z may be regulated from station A while station B is regulated from station M and station V is regulated from station X. Also any stations may be regulated from a plurality of other stations.

*Application to short-range navigation*

Figure 18:
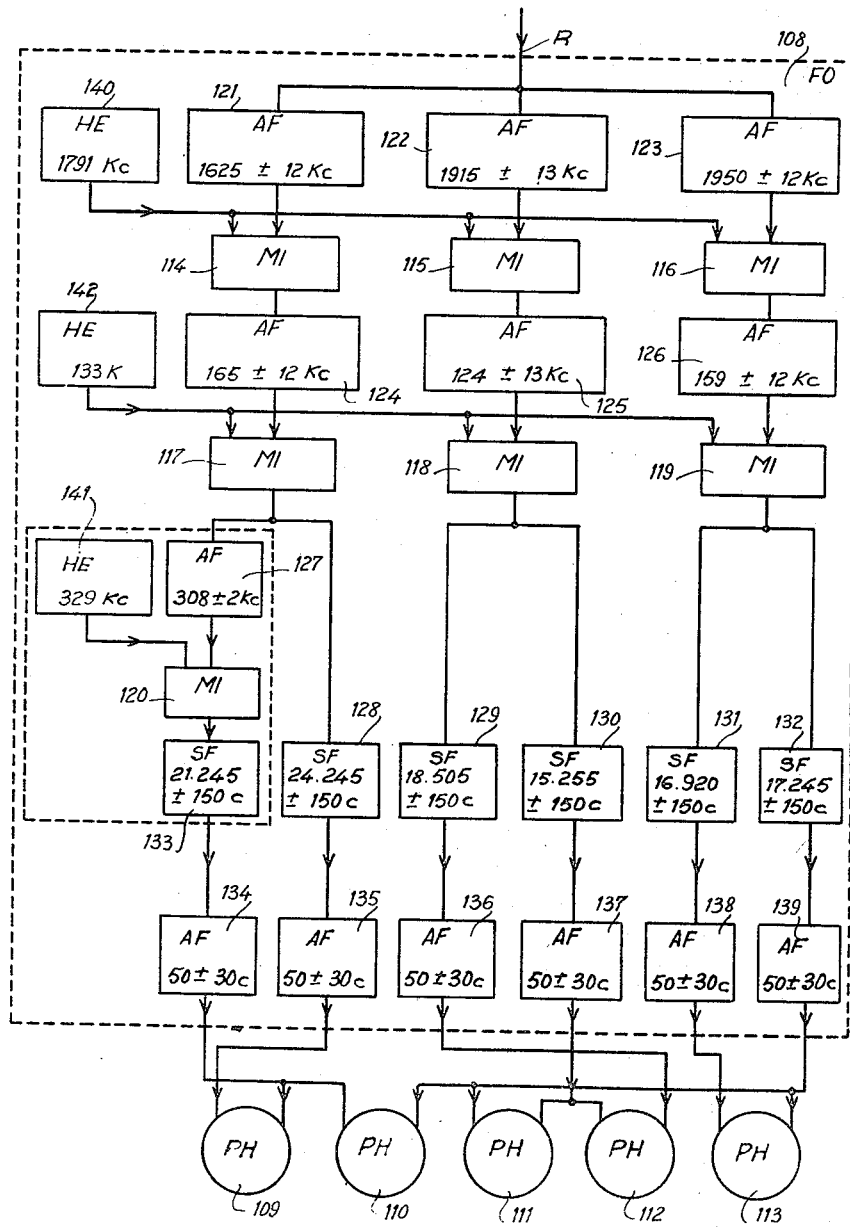
Fig. 18 is a block diagram of a receiver suitable for employement in a short-range combined system.
Figure 19:
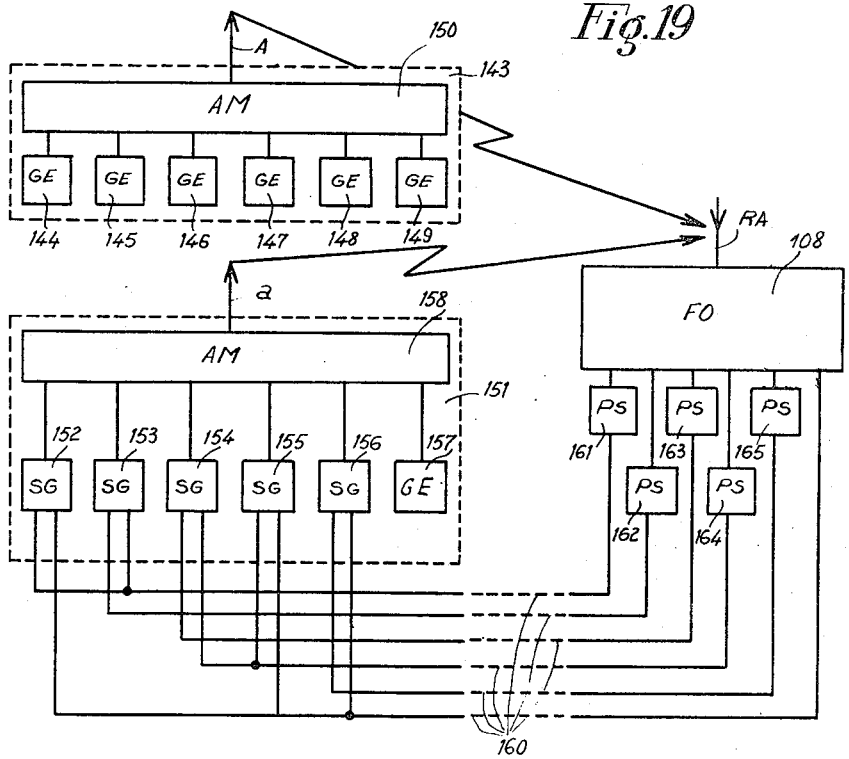
Fig. 19 is a block diagram showing two transmitters suitable for employment with the receiver of Fig. 18 in a short-range combined system.
Figure 20:
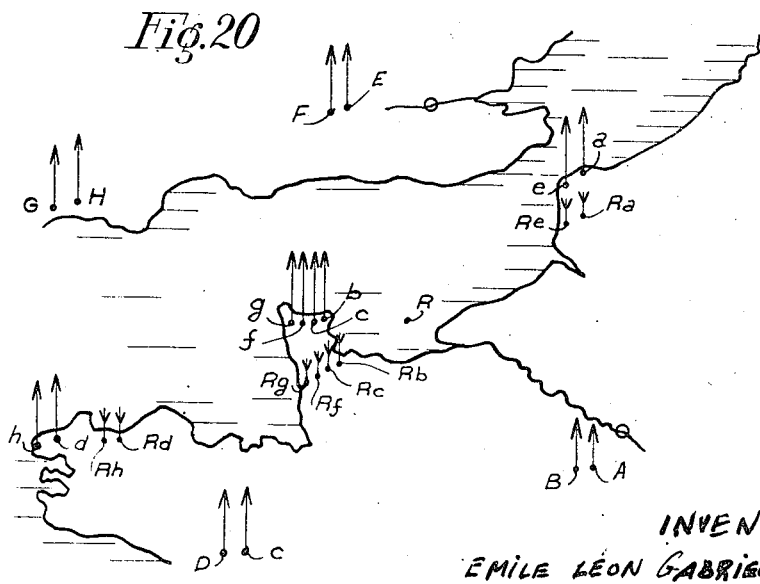
Fig. 20 is a map showing an example of suitable locations of the transmitting stations in a short-range combined system.

The combined system shown in Figs. 18 to 20 inclusive may include 50 stationary transmitting stations A to Z inclusive and $a$ to $z$ inclusive. In the map shown in Fig. 20, suitable positions of several of such stations are indicated. Each station transmits signals of six frequencies. As in the case of the long-range system of Figs. 15 to 17, the present system is based upon the selection of basic frequencies, in this case, six basic frequencies ($F_1$ to $F_6$ inclusive) which bear a definite relation to each other so as to give in the system indications of five degrees of accuracy, preferably differing from each other by a factor of 10. As a specific example, the following basic frequencies have been chosen, although other basic frequencies can be employed.

$$F_1 = 1,615,555 \ c.$$
$$F_2 = 1,634,445 \ c.$$
$$F_3 = 1,904,805 \ c.$$
$$F_4 = 1,908,055 \ c.$$
$$F_5 = 1,940,230 \ c.$$
$$F_6 = 1,940,555 \ c.$$

These frequencies were chosen so that the following relations are satisfied:

$$F_1 + F_2 = 3,250,000 \ c.$$
$$F_6 - F_1 = 325,000 \ c.$$
$$F_6 - F_4 = 32,500 \ c.$$
$$F_4 - F_3 = 3,250 \ c.$$
$$F_6 - F_5 = 325 \ c.$$

The frequencies $F_{A1}$ to $F_{A6}$ transmitted by station A are derived from the basic frequencies $F_1$ to $F_6$ respectively in accordance with the following relations, where $f_A$ is a constant:

$$F_{A1} = F_1 + f_A$$
$$F_{A2} = F_2 - f_A$$
$$F_{A3} = F_3 + f_A$$
$$F_{A4} = F_4 + f_A$$
$$F_{A5} = F_5 + f_A$$
$$F_{A6} = F_6 + f_A$$

The frequencies transmitted by any other station are found by merely substituting the subscript appropriate to that station for the A's in the above relations. Thus, for example, $$F_{a1} = F_1 + f_a$$
$$F_{B2} = F_2 - f_B, \ \text{etc.}$$

The constants $f_A$ to $f_Z$ and $f_a$ to $f_z$ were chosen in accordance with the following relations:

$$f_A = 715 \text{ c.}$$
$$f_B = 2 \times 715 = 1,430 \text{ c.}$$
$$\ldots\ldots\ldots\ldots\ldots\ldots$$
$$f_Z = 25 \times 715 = 17,875 \text{ c.}$$
$$f_a = 715 - 50 = 665 \text{ c.}$$
$$f_b = 2 \times 715 - 50 = 1,380 \text{ c.}$$
$$\ldots\ldots\ldots\ldots\ldots\ldots$$
$$f_z = 25 \times 715 - 50 = 17,825 \text{ c.}$$

Since there are a total of 50 transmitting stations, each transmitting six frequencies, the system employs a total of 300 frequencies. With the frequencies $F_1$ to $F_6$ above assumed, the frequencies are distributed in three bands about 20 kilocycles wide, the central frequencies of the various bands being 1625, 1915 and 1950 kilocycles.

From the relations above given, the frequencies of the signals transmitted from stations A and $a$ are as follows:

$$F_{A1} = 1,615,555 + 715 = 1,616,270 \text{ c.}$$
$$F_{A2} = 1,634,445 - 715 = 1,633,730 \text{ c.}$$
$$F_{A3} = 1,904,805 + 715 = 1,905,520 \text{ c.}$$
$$F_{A4} = 1,908,055 + 715 = 1,908,770 \text{ c.}$$
$$F_{A5} = 1,940,230 + 715 = 1,940,945 \text{ c.}$$
$$F_{A6} = 1,940,555 + 715 = 1,941,270 \text{ c.}$$
$$F_{a1} = 1,615,555 + 665 = 1,616,220 \text{ c.}$$
$$F_{a2} = 1,634,445 - 665 = 1,633,780 \text{ c.}$$
$$F_{a3} = 1,904,805 + 665 = 1,905,470 \text{ c.}$$
$$F_{a4} = 1,908,055 + 665 = 1,908,720 \text{ c.}$$
$$F_{a5} = 1,940,230 + 665 = 1,940,895 \text{ c.}$$
$$F_{a6} = 1,940,555 + 665 = 1,941,220 \text{ c.}$$

From the above frequencies, five groups having four frequencies each may be selected which satisfy the relation $$K_1 F_1 + K_2 F_2 + K_3 F_3 + K_4 F_4 = 0$$

These groups of frequencies with their corresponding values of $K$ are as follows:

Group $G_{A1}$ of frequencies $F_{A1}$, $F_{A2}$, $F_{a1}$ and $F_{a2}$ having values of $K$ of $+1$, $+1$, $-1$ and $-1$ respectively;

Group $G_{A2}$ of frequencies $F_{A6}$, $F_{A1}$, $F_{a6}$ and $F_{a1}$ having values of $K$ of $+1$, $-1$, $-1$ and $+1$ respectively;

Group $G_{A3}$ of frequencies $F_{A6}$, $F_{A4}$, $F_{a6}$ and $F_{a4}$ having values of $K$ of $+1$, $-1$, $-1$ and $+1$ respectively;

Group $G_{A4}$ of frequencies $F_{A4}$, $F_{A3}$, $F_{a4}$ and $F_{a3}$ having values of $K$ of $+1$, $-1$, $-1$ and $+1$ respectively;

Group $G_{A5}$ of the frequencies $F_{A6}$, $F_{A5}$, $F_{a6}$ and $F_{a5}$ having values of $K$ of $+1$, $-1$, $-1$ and $+1$ respectively.

Fig. 18 shows a suitable receiver for employment in the present system. This receiver includes a frequency operator 108 and five phasemeters 109 to 113 inclusive. For purposes of explanation, it will be assumed that this receiver is tuned to receive the signals from transmitting stations A and $a$, although it may be tuned to receive the signals from any other two stations assigned the same letters of the alphabet in the present explanation, such as B and $b$, C and $c$, etc.

The signals from the various stations including stations A and $a$ are received by the aerial R and delivered to the amplifying filters 121, 122 and 123. The amplifying filter 121 has a band pass of $1625 \pm 12$ kilocycles and thus passes the frequencies $F_{A1}$, $F_{A2}$, $F_{a1}$ and $F_{a2}$. The amplifying filter 122 has a band pass of $1915 \pm 13$ kilocycles and thus passes frequencies $F_{A3}$, $F_{A4}$, $F_{a3}$ and $F_{a4}$. The amplifying filter 123 has a band pass of $1950 \pm 12$ kilocycles and thus passes frequencies $F_{A5}$, $F_{A6}$, $F_{a5}$ and $F_{a6}$. The outputs of amplifying filters 121, 122 and 123 are delivered to the mixers 114, 115 and 116 respectively and at the same time a carefully stabilized heterodyne frequency $H_1$ of 1791 kilocycles is delivered to these mixers. The outputs of these mixers are delivered to the amplifying filters 124, 125 and 126 respectively. Since the latter amplifying filters have band passes of $165 \pm 12$ kilocycles, $124 \pm 13$ kilocycles and $159 \pm 12$ kilocycles respectively, they pass only the difference frequencies corresponding to the received signals which are as follows:

Amplifying filter 124

$$H_1 - F_{A1} = 174,730 \text{ cycles}$$
$$H_1 - F_{A2} = 157,270 \text{ cycles}$$
$$H_1 - F_{a1} = 174,780 \text{ cycles}$$
$$H_1 - F_{a2} = 157,220 \text{ cycles}$$

Amplifying filter 125

$$F_{A3} - H_1 = 114,520 \text{ cycles}$$
$$F_{A4} - H_1 = 117,770 \text{ cycles}$$
$$F_{a3} - H_1 = 114,470 \text{ cycles}$$
$$F_{a4} - H_1 = 117,720 \text{ cycles}$$

Amplifying filter 126

$$F_{A5} - H_1 = 149,945 \text{ cycles}$$
$$F_{A6} - H_1 = 150,270 \text{ cycles}$$
$$F_{a5} - H_1 = 149,895 \text{ cycles}$$
$$F_{a6} - H_1 = 150,220 \text{ cycles}$$

The outputs of the amplifying filters are delivered to mixers 117, 118 and 119 respectively and an adjustable heterodyne frequency $H_3$ from the tunable oscillator 142 is also delivered to the mixers 117, 118 and 119. When receiving signals from stations A and $a$, this frequency is 133 kilocycles. The output of the mixer 117 is delivered to an amplifying mixer 127 and to a subtraction filter 128. The output of mixer 118 is delivered to subtraction filters 129 and 130 and the output of mixer 119 is delivered to subtraction filters 131 and 132. Mixer 117 produces, among others, the following frequencies:

$$(H_1 - F_{A1}) + H_3 = 307,730 \text{ cycles}$$
$$(H_1 - F_{A2}) - H_3 = 24,270 \text{ cycles}$$
$$(H_1 - F_{a1}) + H_3 = 307,780 \text{ cycles}$$
$$(H_1 - F_{a2}) - H_3 = 24,220 \text{ cycles}$$

The first and third of these frequencies are passed by amplifying filter 127 which has a band pass of $308 \pm 2$ kilocycles. The output of this amplifying filter is then delivered to a mixer 120. A heterodyne frequency of 329 kilocycles is also delivered to the mixer 120 from the oscillator 141. The output of this mixer contains the difference frequencies 21,270 and 21,220 cycles, which are selected and mixed by the subtraction filter 133 to produce a difference frequency of 50 cycles. The other two frequencies listed above from the mixer 117, namely, the frequencies of 24,270 and 24,220 cycles, are selected by and mixed in the subtraction filter 128 to produce a difference frequency of 50 cycles.

The output of mixer 118 contains the following difference frequencies:

$$H_3 - (F_{A3} - H_1) = 18,480 \text{ cycles}$$
$$H_3 - (F_{A4} - H_1) = 14,230 \text{ cycles}$$
$$H_3 - (F_{a3} - H_1) = 18,530 \text{ cycles}$$
$$H_3 - (F_{a4} - H_1) = 14,280 \text{ cycles}$$

The first and third of these frequencies are selected by and mixed in the subtraction filter 136 to produce a difference frequency of 50 cycles. The second and fourth frequencies are selected by and mixed in the subtraction filter 137 to also produce a difference frequency of 50 cycles.

The output of mixer 119 contains the following difference frequencies:

$(F_{A5}-H_1)-H_3=15,945$ cycles
$(F_{A6}-H_1)-H_3=17,270$ cycles
$(F_{a5}-H_1)-H_3=15,895$ cycles
$(F_{a6}-H_1)-H_3=17,220$ cycles The subtraction filter 138 selects and mixes the first and third of these frequencies to produce a difference frequency of 50 cycles. The subtraction filter 139 selects and mixes the second and fourth of these frequencies to also produce a difference frequency of 50 cycles.

The outputs of subtraction filters 133 and 128 to 132 inclusive thus each contain an output frequency of 50 cycles derived from the 12 signals of different frequencies from the stations A and $a$. The outputs of these subtraction filters are delivered to the amplifying filters 134 to 139 respectively, and these latter filters select and pass the 50 cycle difference frequencies to provide six separate 50-cycle currents. The current from the amplifying filter 134 is delivered to phasemeters 109 and 110. The current from amplifying filter 135 is delivered to phasemeter 109. The current from amplifying filter 136 is delivered to phasemeter 112. The current from amplifying filter 137 is delivered to phasemeters 111 and 112. The current from amplifying filter 138 is delivered to phasemeter 113 and the current from amplifying filter 139 is delivered to phasemeters 110, 111 and 113. Two currents of equal frequency (50 cycles) are thus delivered to each of the phasemeters and with the arrangement shown, the following phase difference indications are obtained from the phasemeters 109 to 113 respectively:

$\phi_{sa1}=3,900 \ (D_a-D_A)$
$\phi_{sa2}=390 \ (D_a-D_A)$
$\phi_{sa3}=39 \ (D_a-D_A)$
$\phi_{sa4}=3.9 \ (D_a-D_A)$
$\phi_{sa5}=0.39 \ (D_a-D_A)$ Where $\phi_s$ is in degrees and the distances $D_A$ and $D_a$ are in kilometers and represent the distances between the aerial of the mobile receiver and the aerials of the stations A and $a$ respectively. The receiver of Fig. 18 may be tuned to any other pair of transmitters B and $b$, C and $c$, etc. by adjusting the frequency of oscillator 142. By employing two receivers tuned to different pairs of stations or by successively tuning a single receiver to two different pairs of stations, a complete system made up of two multiple systems each containing five elementary systems is obtained and the mobile receiver may be located without ambiguity.

Fig. 19 shows a pair of transmitting stations suitable for employment with the receiver of Fig. 18 in a short-range system. These stations may, for example, be the transmitting stations A and $a$. Station A may include a transmitter 143 provided with six frequency generators 144 to 149 inclusive. All of these generators may have their frequencies independently controlled, for example, by crystal-control of their oscillators. All of the generators feed a common amplifier 150 which in turn feeds the transmitting aerial. Station $a$, similarly, has six generators 152 to 157 inclusive, five of which (152 to 156 inclusive) are synchronizing generators and one of which (157) may have its frequency independently controlled.

As in station A, the generators all feed a common amplifier 158, which in turn feeds the transmitting aerial.

Station $a$ also includes a control receiving station, preferably located a few kilometers therefrom, having a receiving aerial RA of fixed location which receives the signals from both station A and station $a$. The received signals are delivered to a frequency operator 108 which may be identical with the frequency operator 108 of Fig. 18. This frequency operator produces six currents of equal frequency (50 cycles in the example assumed) as described with reference to Fig. 18. These six currents may be delivered by lines 160 to the synchronizing generators 152 to 156 inclusive, each of which contains a servo-motor mechanically connected to frequency and phase adjusting devices as described with reference to Figs. 2 and 3. The servo-motors in the synchronizing generators 152 to 156 inclusive may be connected to the output of the frequency operator 108 in the same manner that the phasemeters 109 to 113 are connected to the output of the frequency operator 108 in Fig. 18. Five manually adjustable phase shifters 161 to 165 inclusive may be interposed in five of the lines 160. These phase shifters may be employed to adjust the phases of the five currents of equal frequency to compensate for the distances between the fixed receiving aerial and the transmitting aerials and for any other unavoidable phase shifts in the system. That is to say, the transmitting station $a$ is regulated to cause each of the groups ($G_{A1}$ to $G_{A5}$ inclusive) of four frequencies mentioned above and associated with the stations A and $a$ to satisfy at all times the relation $$K_1F_1+K_2F_2+K_3F_3+K_4F_4=0$$

This regulation will also maintain the constant in the relation $$\phi_a-\phi_b=K_1\phi_1+K_2\phi_2+K_3\phi_3+K_4\phi_4+C$$

at any desired value or zero at a selected point in the system.

It is apparent that the system of Figs. 18 to 20 is made up of a plurality of multiple systems, each having five elementary systems, and that two space-transmitting stations are employed for each multiple system. Each multiple system employing two transmitting stations is independent of the others except for the selection of frequencies, as above discussed, which avoids the employment of two signals of equal frequency by different multiple systems in the same area. In many cases, two or more stations will be positioned at the same location as shown in Fig. 20, in which case the same aerials as well as other elements of the transmitting stations may many times be employed for more than one station.

It will be further apparent that any of the combined systems described need not employ all of the stations provided for. Thus the number of stations in the combined systems of Figs. 15 to 17 need not be as great as 25, and the number of stations in the combined system of Figs. 18 to 20 need not be as great as 50.

It was assumed in the above description that all the currents which are used are sinusoidal currents. It is to be noted that a current which is modulated periodically in any manner may be demodulated to provide a plurality of sinusoidal currents. Modulated signals can, however, be employed in the present invention, it being understood that unwanted frequencies can be eliminated either at the transmission stations or at the receiving stations.

Likewise, it was assumed, that all the waves which are used are radio-electric waves. It is to be noted that a sinusoidal electric current may be transformed by means of suitable radiators into a compression wave of the same frequency (ultra-sound, for example), or into a light-wave modulated through the current and that the so obtained compression or light-wave may be retransformed by means of a suitable device into an electric current having the same frequency as the current having given rise to said wave. The invention may be applied, therefore, to systems which use such waves.

Having now described our invention what we claim as new and desire to secure by Letters Patent is:

1. In a system for determining the location of a receiving point respective to spaced transmitters by comparing at said receiving point the phases of signals emitted by said transmitters and received at said receiving point, at least two spaced transmitters for emitting at least three different high frequency waves, the choice of said frequencies being limited by the only condition which is sufficient and necessary that the algebraic sum of the respective products of said frequencies by any integers, at least one of which is positive and at least one of which is negative, is zero, at said receiving point: a receiver comprising in combination filtering, amplifying and mixing means to receive said waves and deduce therefrom by means of differing frequency mixtures two currents having the same frequency and phasemetering means to measure the phase difference between said two currents, thereby to provide an indication about the location of said receiving point respective to said transmitters.

2. In a system for determining the location of a receiving point respective to spaced transmitters by comparing at said receiving point the phases of signals emitted by said transmitters and received at said receiving point, at least two spaced transmitters for emitting at least three different high frequency waves, the choice of said frequencies being limited by the only condition which are sufficient and necessary that the algebraic sum of the respective products of said frequencies by any integers, at least one of which is positive and at least one of which is negative, is at least substantially zero, means for cancelling said algebraic sum and for automatically maintaining it at zero, said means comprising in combination: a receiver comprising in combination filtering, amplifying and mixing means, to receive said waves and to deduce therefrom by means of frequency mixtures two currents the difference between the frequencies of which is equal to said algebraic sum and means responsive to the difference between the frequencies and the difference between the phases of said two currents to act upon the frequency and the phase of one of said emitted waves to cancel said frequency difference and consequently to cancel said algebraic sum, at said receiving point: a receiver comprising in combination filtering, amplifying and mixing means to receive said waves and deduce therefrom by means of differing frequency mixtures two currents having the same frequency and phasemetering means to measure the phase difference between said two currents, thereby to provide an indication about the location of said receiving point respective to said transmitters.

3. In a system utilizing at least three signals the frequencies of which must satisfy the relation $$K_1F_1+K_2F_2 \ldots +K_nF_n=0$$

where $F_1$, $F_2$, ... $F_n$ are said frequencies and $K_1$, $K_2$, ... $K_n$ are integers at least one of which is positive and at least one of which is negative, whereby two currents of equal frequency can be derived from said signals by combination filtering amplifying and mixing means when said relation is satisfied, generators for said signals, a device comprising in combination filtering, amplifying and mixing means for deriving from said signals two currents having different frequencies when said relation is not satisfied, a two phase asynchronous motor having a two-phase stator winding fed by said two currents derived by said device, one of said generators having mechanically actuated frequency and phase control means for the signal generated thereby and mechanical means to connect the rotor of said two phase motor to said frequency and phase controlling means to actuate the same and cancel the frequency difference of said two currents derived by said device.

4. In a system for determining the location of a receiving point respective to spaced transmitters by comparing at said receiving point the phases of signals emitted by said transmitters and received at said receiving point, at least two spaced transmitters for emitting at least three different high frequency waves, the choice of said frequencies being limited by the only conditions which are necessary and sufficient that the algebraic sum of the respective products of said frequencies by any integers which is sufficient and necessary is at least substantially zero, means for cancelling said algebraic sum and for automatically maintaining it at zero, said means comprising in combination: a receiver comprising in combination filtering, amplifying and mixing means, to receive said waves and to deduce therefrom by means of frequency mixtures two currents the difference between the frequencies of which is equal to said algebraic sum, a two phase motor the stator of which is fed by said two currents, means to act upon the frequency and means to act upon the phase of one of said signals and mechanical means to connect the rotor of said two phase motor respectively to said frequency controlling means and to said phase controlling means to cancel the frequency difference of said two currents and consequently said algebraic sum, at said receiving point: a receiver comprising in combination filtering, amplifying and mixing means to receive said waves and deduce therefrom by means of differing frequency mixtures two currents having the same frequency and phase metering means to measure the phase difference between said two currents, thereby to provide an indication about the location of said receiving point respective to said transmitters.

5. In a system for determining the location of a receiving point respective to spaced transmitters by comparing at said receiving point the phases of signals emitted by said transmitters and received at said receiving point, a first, a second, a third, a fourth and a fifth transmitter to emit respectively five continuous pure, high frequency waves having respectively a first, a second, a third, a fourth and a fifth frequency, said first, second, fourth and fifth transmitter being respectively located at the four corners of a square in the center of which is located the third transmitter, said frequencies being all comprised in one comparatively narrow band, said first frequency being smaller than said second frequency, which is smaller than the third, said third frequency being smaller than the fourth which is in turn smaller than the fifth, the respective gaps between on the one hand said first, second, fourth and fifth frequencies and said third frequency on the other being all different, while the sum of said first, second, fourth and fifth frequencies is equal to four times said third frequency at said receiving point: a receiver to receive said five waves, comprising in combination, mixing, filtering and amplifying means to subtract said first and second frequencies from said third frequency, thus to provide respectively a sixth and a seventh frequency, and further comprising in combination mixing, filtering and amplifying means to subtract said third frequency respectively from said fourth and fifth frequencies, thus to provide respectively an eighth and a ninth frequency, means for detecting the beat between said sixth and ninth frequencies and to detect the beat between said seventh and eighth frequencies, and phase-metering means to measure the phase difference between said two beats thus to provide an indication about the position of said receiving point respective to said five transmitters.

6. In a system for determining the location of a receiving point respective to spaced transmitters by comparing at said receiving point the phases of signals emitted by said transmitters and received at said receiving point, a first, a second, a third, a fourth and a fifth transmitter to emit respectively five continuous pure, high frequency waves having respectively a first, a second, a third, a fourth and a fifth frequency, said first, second, fourth and fifth transmitters being respectively located at the four corners of a square in the center of which is located the third transmitter, said frequencies being all comprised in one comparatively narrow band, said first frequency being smaller than said second frequency, which is smaller than the third, said third frequency being smaller than the fourth which is in turn smaller than the fifth, the respective gaps between on the one hand said first, second, fourth and fifth frequencies and said third frequency on the other being all different, while the sum of said first, second, fourth and fifth frequencies is at least substantially equal to four times said third frequency, means for rendering the sum of said first, second, fourth and fifth frequencies equal to four times said third frequency, said means comprising in combination: a receiver to receive said five waves, comprising in combination, mixing, filtering and amplifying means to subtract said first and second frequencies from said third frequency, thus to provide respectively a sixth and a seventh frequency, and further comprising in combination mixing, filtering and amplifying means to subtract said third frequency respectively from said fourth and fifth frequencies, thus to provide respectively an eighth and a ninth frequency, means for detecting the beat between said sixth and ninth frequencies and to detect the beat between said seventh and eighth frequencies, and means responsive to the difference between the frequencies and the difference between the phases of said two currents to control one of said transmitters to regulate the frequency and the phase of one of said emitted waves to cancel said frequency difference and consequently to make said sum of said first, second, fourth and fifth frequencies equal to four times said third frequency, at said receiving point: a receiver to receive said five waves, comprising in combination, mixing, filtering and amplifying means to subtract said first and second frequencies from said third frequency, thus to provide respectively a sixth and a seventh frequency, and further comprising in combination mixing, filtering and amplifying means to subtract said third frequency respectively from said fourth and fifth frequencies, thus to provide respectively an eighth and a ninth frequency, means for detecting the beat between said sixth and ninth frequencies and to detect the beat between said seventh and eighth frequencies, and phase metering means to measure the phase difference between said two beats thus to provide an indication about the position of said receiving point respective to said five transmitters.

7. In a system for determining the location of a receiving point respective to spaced transmitters by comparing at said receiving point the phases of signals emitted by said transmitters and received at said receiving point, a first, a second, a third, a fourth and a fifth transmitter to emit respectively five continuous pure, high frequency waves having respectively a first, a second, a third, a fourth and a fifth frequency, said first, second, fourth and fifth tarnsmitters being respectively located at the four corners of a square in the center of which is located the third transmitter, said frequencies being all comprised in one comparatively narrow band, said first frequency being smaller than said second frequency, which is smaller than the third, said third frequency being smaller than the fourth which is in turn smaller than the fifth, the respective gaps between on the one hand said first, second, fourth and fifth frequencies and said third frequency on the other being all different, while the sum of said first, second, fourth and fifth frequencies is at least substantially equal to four times said third frequency, means for rendering the sum of said first, second, fourth and fifth frequencies equal to four times said third frequency, said means comprising in combination: a two phase motor the stator of which is fed by said two beat currents, means to act upon the frequency and means to act upon the phase of one of said signals and mechanical means to connect the rotor of said two phase motor respectively to said frequency controlling means and to said phase controlling means to cancel the frequency difference of said two beat currents and consequently to render said sum of said first, second, fourth and fifth frequencies equal to four times said third frequency, at said receiving point: a receiver to receive said five waves, comprising in combination mixing, filtering and amplifying means to subtract said first and second frequencies from said third frequency, thus to provide respectively a sixth and a seventh frequency, and further comprising in combination mixing, filtering and amplifying means to subtract said third frequency respectively from said fourth and fifth frequencies, thus to provide respectively on eighth and a ninth frequency, means for detecting the beat between said sixth and ninth frequencies and to detect the beat between said seventh and eighth frequencies, and phase-metering means to measure the phase difference between said two beats thus to provide an indication about the position of said receiving point respective to said five transmitters.

8. In a system for determining the location of a receiving point respective to spaced transmitters by comparing at said receiving point the phases of signals emitted by said transmitters and received at said receiving point, at least two spaced transmitters to emit three continuous pure high frequency waves, said waves having respectively a first, a second, and a third frequency, which are all different but subject to the only condition that the difference between said first and second frequencies is equal to the difference between said second and third frequencies, at said receiving point: a receiver comprising in combination filtering, amplifying and mixing means to receive said waves and deduce therefrom by means of differing frequency mixtures two currents having the same frequency and phase-metering means to measure the phase difference between said two currents, thereby to provide an indication about the location of said receiving point respective to said transmitters.

9. In a system for determining the location of a receiving point respective to spaced transmitters by comparing at said receiving point the phases of signals emitted by said transmitters and received at said receiving point, at least two spaced transmitters to emit three continuous pure high frequency waves, said waves having respectively a first, a second, and a third frequency, which are all different and the choice of which is limited by the only condition that the difference between said first and second frequencies is at least substantially equal to the difference between said second and third frequencies, means for rendering equal said two differences and for automatically maintaining same equal, said means comprising in combination: a receiver to receive said three waves, said receiver comprising in combination a first heterodyne to provide a fourth frequency and mixing, filtering and amplifying means to mix respectively said first and second frequencies with said fourth frequency, thus to provide a fifth and a sixth frequency, a second heterodyne to provide a seventh frequency and mixing, filtering and amplifying means to mix respectively said second and third frequencies with said seventh frequency, thus to provide respectively an eighth and a ninth frequency, mixing, filtering and amplifying means on the one hand to subtract one from the other said fifth and eighth frequencies and provide a first beat current and on the other hand to subtract one from the other said sixth and ninth frequencies to provide a second beat current, and means responsive to the difference between the frequencies and the difference between the phases of said two beat currents to act upon the frequency and the phase of one of said emitted waves to cancel said frequency difference and consequently to render equal said differences between said first and second frequencies and between said second and third frequencies, at said receiving point: a receiver to receive said three waves, said receiver comprising in combination a first heterodyne to provide a fourth frequency and mixing, filtering and amplifying means to mix respectively said first and second frequencies with said fourth frequency, thus to provide a fifth and a sixth frequency, a second heterodyne to provide a seventh frequency and mixing, filtering and amplifying means to mix respectively said second and third frequencies with said seventh frequency, thus to provide respectively an eighth and a ninth frequency, mixing, filtering and amplifying means on the one hand to subtract one from the other said fifth and eighth frequencies and provide a first beat current and on the other hand to subtract one from the other said sixth and ninth frequencies to provide a second beat current, and phase metering means to measure the phase difference between said two beats thus to provide an indication about the position of said receiving point respective to said transmitters.

10. In a system for determining the location of a receiving point respective to spaced transmitters by comparing at said receiving point the phases of signals emitted by said transmitters and received at said receiving point, at least two spaced transmitters to emit three continuous pure high frequency waves, said waves having respectively a first, a second, and a third frequency, which are all different and the choice of which is limited by the only condition that the difference between said first and second frequencies is at least substantially equal to the difference between said second and third frequencies, means for rendering equal said two differences and for automatically maintaining same equal, said means comprising in combination: a receiver to receive said three waves, said receiver comprising in combination a first heterodyne to provide a fourth frequency and mixing, filtering and amplifying means to mix respectively said first and second frequencies with said fourth frequency, thus to provide a fifth and a sixth frequency, a second heterodyne to provide a seventh frequency and mixing, filtering and amplifying means to mix respectively said second and third frequencies with said seventh frequency, thus to provide respectively an eighth and a ninth frequency, mixing, filtering and amplifying means on the one hand to subtract one from the other said fifth and eighth frequencies and provide a first beat current and on the other hand to subtract one from the other said sixth and ninth frequencies to provide a second beat current, a two phase motor the stator of which is fed by said two beat currents, means to act upon the frequency and means to act upon the phase of one of said signals and mechanical means to connect the rotor of said two phase motor respectively to said frequency controlling means and to said phase controlling means to cancel the frequency difference of said two beat currents and consequently to render equal said differences between said first and second frequencies and between said second and third frequencies, at said receiving point: a receiver to receive said three waves, said receiver comprising in combination a first heterodyne to provide a fourth frequency and mixing, filtering and amplifying means to mix respectively said first and second frequencies with said fourth frequency, thus to provide a fifth and a sixth frequency, a second heterodyne to provide a seventh frequency and mixing, filtering and amplifying means to mix respectively said second and third frequencies with said seventh frequency, thus to provide respectively an eighth and a ninth frequency, mixing, filtering and amplifying means on the one hand to subtract one from the other said fifth and eighth frequencies and provide a first beat current and on the other hand to subtract one from the other said sixth and ninth frequencies to provide a second beat current, and phase metering means to measure the phase difference between said two beats thus to provide an indication about the position of said receiving point respective to said transmitters.

11. In a system for determining the location of a receiving point respective to spaced transmitters by comparing at said receiving point the phases of signals emitted by said transmitters and received at said receiving point, at least two spaced transmitters to emit four different continuous pure high frequency waves subject to the only condition that the difference between two of said frequencies is equal to the difference between two other frequencies, a receiver comprising in combination filtering, amplifying and mixing means to receive said waves and deduce therefrom by means of differing frequency mixtures two currents having the same frequency and phasemetering means to measure the phase difference between said two currents, thereby to provide an indication about the location of said receiving point respective to said transmitters.

12. In a system for determining the location of a receiving point respective to spaced transmitters by comparing at said receiving point the phases of signals emitted by said transmitters and received at said receiving point, at least two spaced transmitters to emit four different continuous pure high frequency waves, the choice of these frequencies being limited by the only condition that the difference between two of said frequencies is at least substantially equal to the difference between two other frequencies, means for rendering equal said two differences and for automatically maintaining them equal, said means comprising in combination: a receiver comprising in combination filtering, amplifying and mixing means to receive said waves and deduce therefrom by differing frequency mixtures two currents the difference between the frequencies of which is equal to the difference of said above mentioned frequency differences, and means responsive to the difference between the frequencies and the difference between the phases of said two currents to control one of said transmitters to regulate the frequency and the phase of the wave emitted thereby to cancel said last mentioned frequency difference and consequently to render equal said two first mentioned frequency differences, a receiver at said receiving point comprising in combination filtering, amplifying and mixing means to receive said waves and derive therefrom by means of differing frequency mixtures two currents having the same frequency and phasemetering means to measure the phase difference between said two currents to provide an indication about the location of said receiving point respective to said transmitters.

13. In a system for determining the location of a receiving point respective to spaced transmitters by comparing at said receiving point the phases of signals emitted by said transmitters and received at said receiving point, at least two spaced transmitters to emit four different continuous pure high frequency waves, the choice of these frequencies being limited by the only condition that the difference between two of said frequencies is at least substantially equal to the difference between two other frequencies, means for rendering equal said two differences and for automatically maintaining them equal, said means comprising in combination: a receiver comprising in combination filtering, amplifying and mixing means to receive said waves and deduce therefrom by differing frequency mixtures two currents the difference between the frequencies of which is equal to the difference of said above mentioned frequency differences, a two phase motor the stator of which is fed by said two currents, means to act upon the frequency and means to act upon the phase of one of said signals and mechanical means to connect the rotor of said two phase motor respectively to said frequency controlling means and to said phase controlling means to cancel the frequency difference between said two currents and consequently said difference between the frequency differences between two of said emitted waves and two others of them, at said receiving point: a receiver comprising in combination filtering, amplifying and mixing means to receive said waves and deduce therefrom by means of differing frequency mixtures two currents having the same frequency and phasemetering means to measure the phase difference between said two currents, thereby to provide an indication about the location of said receiving point respective to said transmitters.

14. In a system for determining the location of a receiving point respective to spaced transmitters by comparing at said receiving point the phases of signals emitted by said transmitters and received at said receiving point, at least two spaced transmitters to emit continuous, pure waves having respectively a first, a second, a third and a fourth frequencies, said frequencies being different high frequencies, the choice of which is limited by the only condition that the difference of two of said frequencies is equal to the difference of two other, at said receiving point, a receiver to receive said four waves, said receiver comprising in combination, a first heterodyne to provide a fifth frequency and mixing, filtering and amplifying means to mix respectively said fifth frequency and said first and third frequencies to provide respectively a sixth and a seventh frequency, a second heterodyne to provide an eighth frequency, further mixing, filtering and amplifying means to mix respectively said second and fourth frequencies with said eighth frequency to provide a ninth and a tenth frequency, further mixing, filtering and amplifying means to subtract on the one hand one from the other said sixth and ninth frequencies to provide a first beat current and to subtract on the other hand one from the other said seventh and tenth frequencies to provide a second beat current, phasemetering means to measure the phase differences between said two beats thus to provide an indication about the position of said receiving point respective to said transmitters.

15. In a system for determining the location of a receiving point respective to spaced transmitters by comparing at said receiving point the phases of signals emitted by said transmitters and received at said receiving point, at least two spaced transmitters to emit four continuous pure high frequency waves, respectively having a first, a second, a third and a fourth frequency which are all different and the choice of which is limited by the only condition that the beat between said first and third frequencies on the one hand and between said second and fourth frequencies on the other are equal low frequencies at said receiving point, a receiver comprising in combination filtering, amplifying and mixing means to receive through a first channel said first and third frequencies and to detect the beat thereof and to receive through a second channel said second and fourth frequencies and to detect the beat thereof, and phase metering means to measure the phase difference between said two beats thus to provide an indication about the position of said receiving point respective to said transmitters.

16. In a system for determining the location of a receiving point respective to spaced transmitters by comparing at said receiving point the phases of signals emitted by said transmitters and received at said receiving point, three spaced transmitters to emit a first, a second, a third and a fourth continuous pure high frequency wave having respectively a first, a second, a third and a fourth frequency, said first transmitter emitting said first and second frequencies, and said second and third transmitters emitting respectively said third and fourth frequencies, all said frequencies being different and the choice thereof being subject to the only condition that the difference between said first and third frequencies is equal to the difference between said second and fourth frequencies, at said receiving point: a receiver comprising in combination filtering amplifying and mixing means to receive said waves and deduce therefrom by means of differing frequency mixtures two currents having the same frequency and phasemetering means to measure the phase difference between said two currents, thereby to provide an indication about the location of said receiving point respective to said transmitters.

17. In a system for determining the location of a receiving point respective to spaced transmitters by comparing at said receiving point the phases of signals emitted by said transmitters and received at said receiving point, two spaced transmitters to emit a first, a second, a third and a fourth continuous pure high frequency wave having respectively a first, a second, a third and a fourth frequency, one of said transmitters emitting said first wave and the other said second, third, and fourth waves, said frequencies being all different and their choice being subject to the only condition that the difference between said first and third frequencies is equal to the difference of said second and fourth frequencies, at said receiving point: a receiver comprising in combination filtering, amplifying and mixing means to receive said waves and deduce therefrom by means of differing frequency mixtures two currents having the same frequency and phasemetering means to measure the phase difference between said two currents, thereby to provide an indication about the location of said receiving point respective to said transmitters.

18. In a system for determining the location of a receiving point respective to spaced transmitters by comparing at said receiving point the phases of signals emitted by said transmitters and received at said receiving point, two spaced transmitters to emit a first, a second, a third and a fourth continuous pure high frequency wave having respectively a first, a second, a third and a fourth frequency, one of said transmitters emitting said first and second waves and the other said third and fourth waves, said frequencies being all different and their choice being subject to the only condition that the difference between said first and third frequencies is equal to the difference of said second and fourth frequencies, at said receiving point: a receiver comprising in combination filtering, amplifying and mixing means to receive said waves and deduce therefrom by means of differing frequency mixtures two currents having the same frequency and phasemetering means to measure the phase difference between said two currents, thereby to provide an indication about the location of said receiving point respective to said transmitters.

19. In a system for determining the location of a receiving point respective to spaced transmitters by comparing at said receiving point the phases of signals emitted by said transmitters and received at said receiving point, this comparison comprising at least two measurements of phase differences giving with different degrees of accuracy the amount of the difference between the distances respectively separating said receiving point from two of said transmitters, two spaced transmitters, the first to emit three continuous high frequency waves having respectively a first, a second and a third frequency and the second to emit three continuous high frequency waves having respectively a fourth, a fifth and a sixth frequency, said first, second, fourth and fifth frequencies forming a first four wave group characterized in that the difference between said first and fourth frequencies is equal to the difference between said second and fifth frequencies, and said second, third, fifth and sixth frequencies forming a second four wave group characterized in that the difference between said second and fifth frequencies is equal to the difference between said third and sixth frequencies, at said receiving point: a receiver to receive said two four wave groups, said receiver comprising in combination filtering, amplifying and mixing means to derive from said first four wave group by differing frequency mixtures a first and a second current having identical frequencies and to derive from said second four wave group by differing frequency mixtures, a third and a fourth current having identical frequencies and phasemetering means to measure on the one hand the phase difference between said first and second currents and on the other hand between said third and fourth currents thus to provide two measures giving with different degrees of accuracy the amount of the distance difference between said receiving point and said two transmitters.

20. In a system for determining the location of a receiving point respective to spaced transmitters by comparing at said receiving point the phases of signals emitted by said transmitters and received at said receiving point, this comparison comprising at least two measurements of phase differences giving with different degrees of accuracy the amount of the difference between the distances respectively separating said receiving point from two of said transmitters, two spaced transmitters, the first to emit three continuous high frequency waves having respectively a first, a second and a third frequency and the second to emit three continuous high frequency waves having respectively a fourth, a fifth and a sixth frequency, said first, second, fourth and fifth frequencies forming a first four wave group characterized in that the difference between said first and fourth frequencies and the difference between said second and fifth frequencies are low frequencies equal to each other and said second, third, fifth and sixth frequencies forming a second four wave group characterised in that the difference between said second and fifth frequencies and the difference between said third and sixth frequencies are low frequencies, equal to each other, at said receiving point: a receiver comprising in combination filtering, amplifying and mixing means to receive respectively through three channels said first and fourth, said second and fifth, and said third and sixth frequencies, and detecting means to detect respectively a first, a second and a third beat currents and phasemetering means to measure the phase difference on the one hand between said first and second beat currents and on the other hand between said second and third beat currents, thus to provide two measures giving with different degrees of accuracy the amount of the distance difference between said receiving point and said two transmitters.

21. In a system for determining the location of a receiving point respective to spaced transmitters by comparing at said receiving point the phases of signals emitted by said transmitters and received at said receiving point, this comparison comprising at least two measurements of phase differences giving with different degrees of accuracy the amount of the difference between the distances separating said receiving point from any two of said transmitters, three spaced transmitters to emit nine continuous pure high frequency waves all different but comprised in the same frequency band, the waves emitted by the first having respectively a first, a second and a third frequency, the waves emitted by the second having a fourth, a fifth and a sixth frequency, and those emitted by the third a seventh, an eighth and a ninth frequency, said first, second, fourth and fifth frequency building up a first four-wave group characterised in that the difference between said first and fourth frequencies is equal to the difference between said second and fifth frequencies, said second, third, fifth and sixth frequencies building up a second four wave group, characterized in that the difference between said second and fifth frequencies is equal to the difference between said third and sixth frequencies, said fourth, fifth, seventh and eighth frequencies building up a third, four wave group characterized in that the difference between said fourth and seventh frequencies is equal to the difference between said fifth and eighth frequencies, said fifth, sixth, seventh and ninth frequencies building up a fourth four wave group characterized in that the difference between said fifth and eighth frequencies is equal to the difference between said sixth and ninth frequencies, said first, second, seventh and eighth frequencies building up a fifth four wave group characterized in that the difference between said first and seventh frequencies is equal to the difference between said second and eighth frequencies, said second, third, eighth and ninth frequencies building up a sixth four wave group characterized in that the difference between said second and eighth frequencies is equal to the difference between said third and ninth frequencies, at said receiving point a receiver capable of being tuned on any two of said transmitters to receive the two four wave groups built up by the six waves emitted by said two emitters, said receiver comprising in combination: filtering, amplifying and mixing means to derive from one of said four wave groups by differing frequency mixtures a first and a second current having identical frequencies and to derive from the other of said four wave groups by differing frequency mixtures a third and a fourth current having identical frequencies and phase metering means to measure on the one hand the phase difference between said first and second currents and on the other hand between said third and fourth currents thus to provide two measures giving with different degrees of accuracy the amount of the distance difference between said receiving point and said two transmitters.

22. In a system for determining the location of a receiving point respective to spaced transmitters by comparing at said receiving point the phases of signals emitted by said transmitters and received at said receiving point, this comparison comprising at least two measurements of phase differences giving with different degrees of accuracy the amount of the difference between the distances separating said receiving point from any two of said transmitters, three spaced transmitters to emit nine continuous pure high frequency waves, all different but comprised in the same frequency band, the waves emitted by the first having respectively a first, a second and a third frequency, the waves emitted by the second having a fourth, a fifth and a sixth frequency, and those emitted by the third a seventh, an eighth and a ninth frequency, said first, second, fourth and fifth frequencies building up a first four-wave group characterized in that the difference between said first and fourth frequencies is equal to the difference between said second and fifth frequencies, said second, third, fifth and sixth frequencies building up a second four wave group, characterized in that the difference between said second and fifth frequencies is equal to the difference between said third and sixth frequencies, said fourth, fifth, seventh and eighth frequencies building up a third four wave group characterized in that the difference between said fourth and seventh frequencies is equal to the difference between said fifth and eighth frequencies, said fifth, sixth, seventh and ninth frequencies building up a fourth four wave group characterized in that the difference between said fifth and eighth frequencies is equal to the difference between said sixth and ninth frequencies, said first, second, seventh and eighth frequencies building up a fifth four wave group characterized in that the difference between said first and seventh frequencies is equal to the difference between said second and eighth frequencies, said third, eighth and ninth frequencies building up a sixth four wave group characterized in that the difference between said second and eighth frequencies is equal to the difference between said third and ninth frequencies, at said receiving point a receiver capable of being tuned on any two of said transmitters to receive the two four wave groups built up by the six waves emitted by said two emitters, said receiver comprising in combination: two adjustable heterodynes to provide respectively a tenth and an eleventh frequency, filtering, amplifying and mixing means to mix said tenth frequency respectively with the three frequencies taken in ascending order which are emitted by one of said two transmitters to provide respectively a twelfth, a thirteenth and a fourteenth frequency, further filtering, amplifying and mixing means to mix said eleventh frequency respectively with the three frequencies taken in ascending order which are emitted by said second transmitter, to provide respectively a fifteenth, a sixteenth and a seventeenth frequency further filtering, amplifying and mixing means to mix said twelfth, and fifteenth, said thirteenth and sixteenth, said fourteenth and seventeenth frequencies thus to provide respectively a first, a second and a third beat currents and phasemetering means, to measure the phase difference on the one hand between said first and second beat currents and on the other hand between said second and third beat currents thus to provide two measures giving with different degrees of accuracy the amount of the distance difference between said receiving point and said two transmitters.

23. In a system for determining the location of a receiving point relative to spaced transmitters, at least two spaced transmitters emitting at least three different signals having frequencies which are independent of each other except that they satisfy the relation $$K_1F_1+K_2F_2 \ldots +K_nF_n=0$$

where $F_1, F_2 \ldots F_n$ are said frequencies and $K_1, K_2, \ldots K_n$ are integers at least one of which is positive and at least one of which is negative, whereby two currents of the same frequency can be derived from said signals by combination filtering, mixing and amplifying means, a receiver at said receiving point including combination amplifying, filtering and mixing means to receive said signals and derive therefrom two currents of the same frequency, and means to measure the phase difference between said last-mentioned two currents as an indication about the position of said receiving point relative to said transmitters.

24. In a system for determining the location of a receiving point relative to spaced transmitters by comparing at said receiving point the phases of signals emitted by said transmitters and received at said receiving point, at least two spaced transmitters for emitting at least three different high frequency signals having frequencies which satisfy the relation $$K_1F_1+K_2F_2 \ldots +K_nF_n=0$$

where $F_1, F_2 \ldots F_n$ are said frequencies and $K_1, K_2, \ldots K_n$ are integers at least one of which is positive and at least one of which is negative, whereby two currents of equal frequency can be derived from said signals by combination filtering, amplifying and mixing means, a receiver of fixed location having filtering, amplifying and mixing means to receive said signals and derive therefrom two currents having the same frequency when said relation is satisfied, one of said transmitters having a frequency and phase regulating device, means responsive to the difference between the frequencies and the difference between the phases of said two currents derived by said receiver when said relation is not satisfied to actuate said frequency and phase regulating device to cause the frequencies of said signals to again satisfy said relation, a receiver at said receiving point having filtering, amplifying and mixing means to receive said signals and derive therefrom two currents having the same frequency, and phasemetering means to measure the phase difference between the last-mentioned two currents to provide an indication about the location of said receiving point relative to said transmitters.

25. In a system for determining the location of a receiving point relative to spaced transmitters by comparing at said receiving point the phases of signals emitted by said transmitters and received at said receiving point, at least two spaced transmitters for emitting at least three different high frequency signals having frequencies which satisfy the relation $$K_1F_1+K_2F_2 \ldots +K_nF_n=0$$

where $F_1, F_2, \ldots F_n$ are said frequencies and $K_1, K_2, \ldots K_n$ are integers at least one of which is positive and at least one of which is negative, whereby two currents of equal frequency can be derived from said signals by combination filtering, amplifying and mixing means, a receiver of fixed location having combination filtering, amplifying and mixing means to receive said signals and derive therefrom two currents having the same frequency when said relation is satisfied, a two-phase asynchronous motor having a two-phase stator winding fed by said two currents derived by said receiver, one of said transmitters having mechanically actuated frequency and phase controlling means for a signal emitted thereby, mechanical means to connect the rotor of said motor to said frequency and phase controlling means to actuate the same and cancel the frequency difference of the two currents derived by said receiver, a receiver at said receiving point having combination filtering, amplifying and mixing means to receive said signals and derive therefrom two currents having the same frequency and phasemetering means to measure the phase difference between said two currents derived by said receiver at said receiving point to provide an indication about the location of said receiving point relative to said transmitters.

26. In a system for determining the position of a receiving point, at least two spaced transmitters emitting signals of at least three frequencies, means to regulate one of said frequencies so that said frequencies at least substantially satisfy the relation $$K_1F_1+K_2F_2 \ldots +K_nF_n=0$$

where $F_1, F_2 \ldots F_n$ are the frequencies and $K_1, K_2 \ldots K_n$ are integers at least one of which is positive and at least one of which is negative, whereby two currents can be derived from said signals by combination filtering, amplifying and mixing means which currents have the same frequency when said relation is satisfied and have a frequency difference when said relation is not satisfied, said means including a frequency varying device in one of said transmitters, means responsive to all of said signals and having combination amplifying, filtering and mixing means for deriving two currents from said signals and means responsive to any differences in frequency and phase between the last-mentioned two currents when said relation is not satisfied for actuating said frequency varying device to vary said one frequency to compensate for any lack of stability of the other frequencies and cause said relation to be again satisfied, a receiver at said receiving point having combined amplifying, filtering and mixing means for deriving two currents of the same frequency from said signals when said relation is satisfied, and means to determine the phase difference between the last-mentioned two currents as an indication with respect to the position of said receiving point.

EMILE LÉON GABRIEL TORCHEUX.
ETIENNE AUGUSTIN HENRI HONORÉ.

References Cited in the file of this patent

UNITED STATES PATENTS

| Number | Name | Date |
|---|---|---|
| Re. 23,050 | Brunner | Nov. 23, 1948 |
| 2,144,203 | Shanklin | Jan. 17, 1939 |
| 2,148,267 | Honore | Feb. 21, 1939 |
| 2,408,773 | Goodall | Oct. 8, 1946 |
| 2,430,244 | O'Brien | Nov. 4, 1947 |
| 2,511,030 | Woodward | June 13, 1950 |
| 2,513,315 | Hawkins | July 4, 1950 |
| 2,513,316 | Hawkins | July 4, 1950 |

FOREIGN PATENTS

| Number | Country | Date |
|---|---|---|
| 546,000 | Germany | Mar. 8, 1932 |
| 120,663 | Sweden | Jan. 20, 1948 |